US009201470B2

(12) United States Patent
Kim et al.

(10) Patent No.: US 9,201,470 B2
(45) Date of Patent: Dec. 1, 2015

(54) MOBILE TERMINAL AND THREE-DIMENSIONAL (3D) MULTI-ANGLE VIEW CONTROLLING METHOD THEREOF

(75) Inventors: Jonghwan Kim, Incheon (KR); Ramesh Venkatachalapathy, Karnataka (IN); V. Srinivas Chakravarthy, Karnataka (IN); Hemanth Kumar Vulavala, Karnataka (IN)

(73) Assignee: LG ELECTRONICS INC., Seoul (KR)

( * ) Notice: Subject to any disclaimer, the term of this patent is extended or adjusted under 35 U.S.C. 154(b) by 771 days.

(21) Appl. No.: 13/370,178

(22) Filed: Feb. 9, 2012

(65) Prior Publication Data

US 2012/0257025 A1 Oct. 11, 2012

(30) Foreign Application Priority Data

Apr. 8, 2011 (KR) ........................ 10-2011-0032915

(51) Int. Cl.
*H04N 13/04* (2006.01)
*G06F 1/16* (2006.01)
*G06F 3/0488* (2013.01)
(52) U.S. Cl.
CPC .......... *G06F 1/1694* (2013.01); *G06F 3/04883* (2013.01); *H04N 13/0497* (2013.01); *G06F 2203/04803* (2013.01)
(58) Field of Classification Search
CPC ............ H04N 13/0497; G06F 3/04883; G06F 2203/04803; G06F 1/1694
USPC .......................................................... 348/51
See application file for complete search history.

(56) References Cited

U.S. PATENT DOCUMENTS

| 2001/0048481 | A1 | 12/2001 | Hatano et al. |
| 2002/0036712 | A1 | 3/2002 | Kim |
| 2007/0002077 | A1* | 1/2007 | Gopalakrishnan ............ 345/619 |
| 2008/0151125 | A1 | 6/2008 | Bucchieri |
| 2008/0263472 | A1 | 10/2008 | Thukral et al. |
| 2009/0148124 | A1 | 6/2009 | Athsani et al. |

(Continued)

FOREIGN PATENT DOCUMENTS

| CN | 101727275 A | 6/2010 |
| EP | 2161652 | 3/2010 |

(Continued)

OTHER PUBLICATIONS

The State Intellectual Property Office of the People's Republic of China Application Serial No. 201210068482.5, Office Action dated Feb. 7, 2014, 7 pages.

(Continued)

*Primary Examiner* — Dave Czekaj
*Assistant Examiner* — Berteau Joisil
(74) *Attorney, Agent, or Firm* — Lee, Hong, Degerman, Kang & Waimey

(57) ABSTRACT

Disclosed are a mobile terminal and a method for controlling a 3D multi-angle view thereof. Multi-angle views of a 3D image captured by a plurality of cameras are displayed, switched (converted) and selected according to a touch input. And, a selected angle view of the 3D image undergoes a capturing or a recording. While appreciating different-angle views of a 3D image (broadcast image) captured by a plurality of cameras, a desired angle view of the 3D image may be played, recorded and stored with using a user interface. This may enhance a user's convenience.

28 Claims, 19 Drawing Sheets

(56) References Cited

U.S. PATENT DOCUMENTS

2009/0153549 A1* 6/2009 Lynch et al. .................. 345/419
2010/0020068 A1* 1/2010 House .......................... 345/419

FOREIGN PATENT DOCUMENTS

| WO | 2008/030879 | 3/2008 |
| WO | 2010/080639 | 7/2010 |

OTHER PUBLICATIONS

European Patent Office Application Serial No. 12000801.6, Search Report dated Dec. 13, 2012, 18 pages.
"MacBook Pro Multitouch Track Pad," XP054975681, Nov. 2009, 1 page.
European Patent Office Application Serial No. 12000801.6, Search Report dated Jan. 28, 2015, 7 pages.

* cited by examiner

FIG. 5B
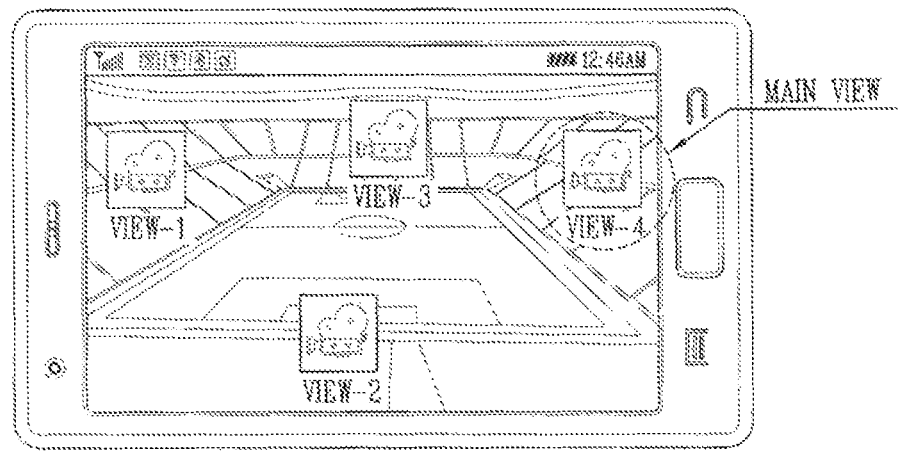
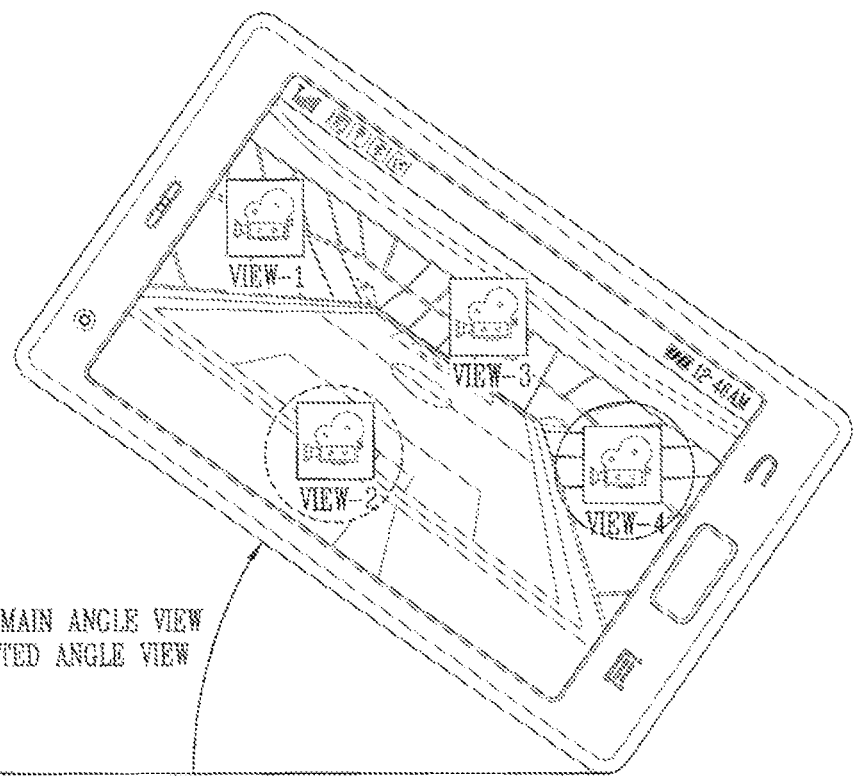

FIG. 9A
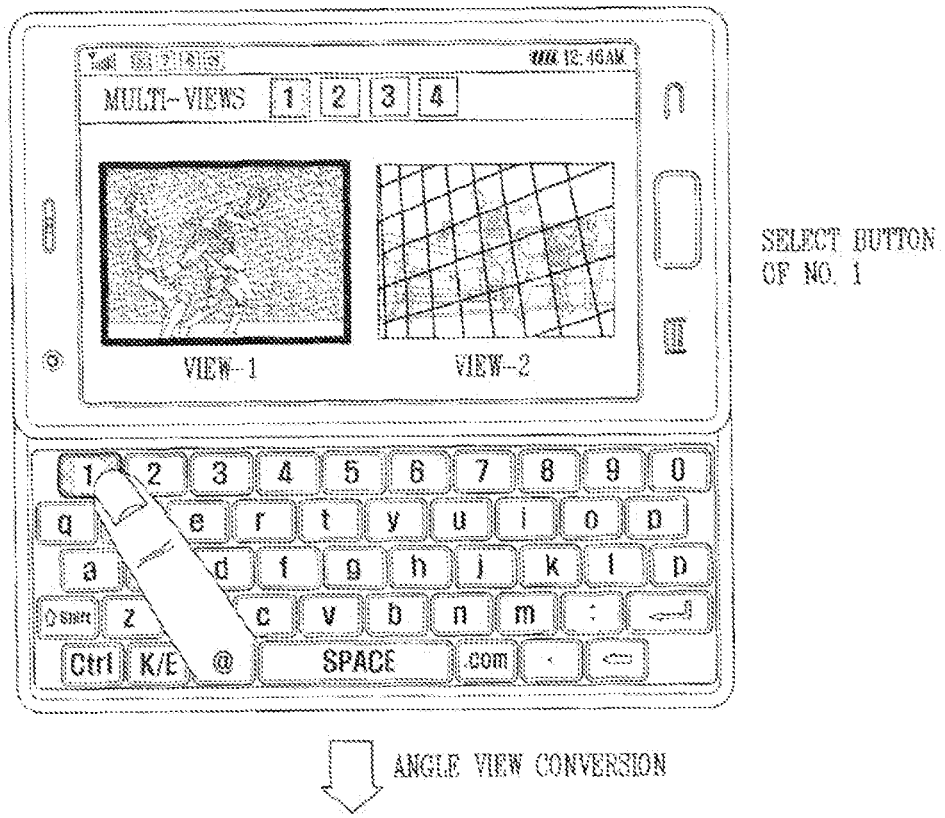
SELECT BUTTON OF NO. 1
ANGLE VIEW CONVERSION
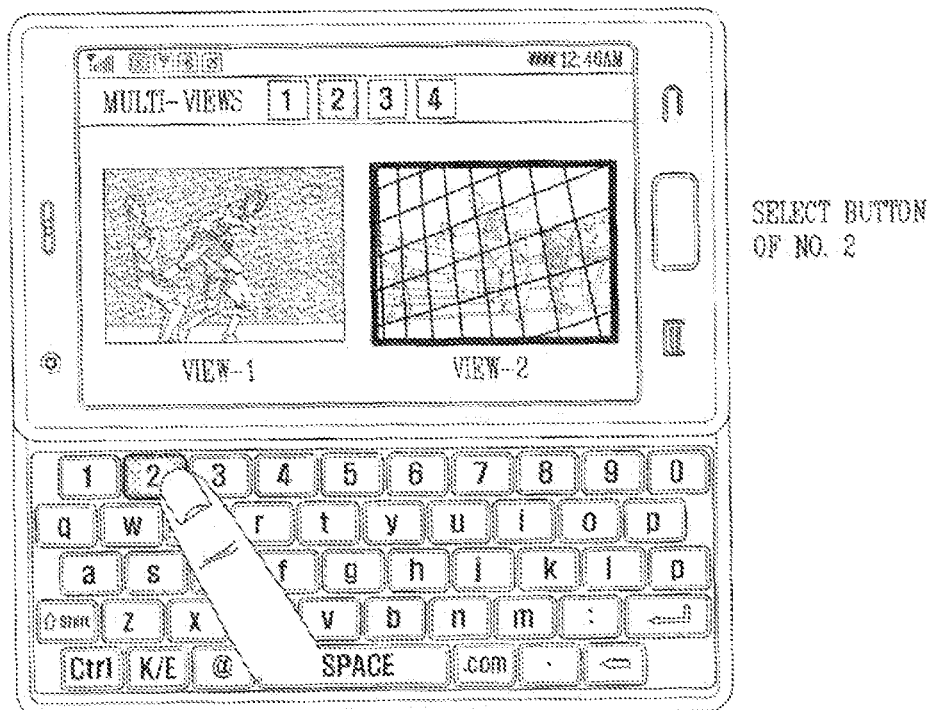
SELECT BUTTON OF NO. 2

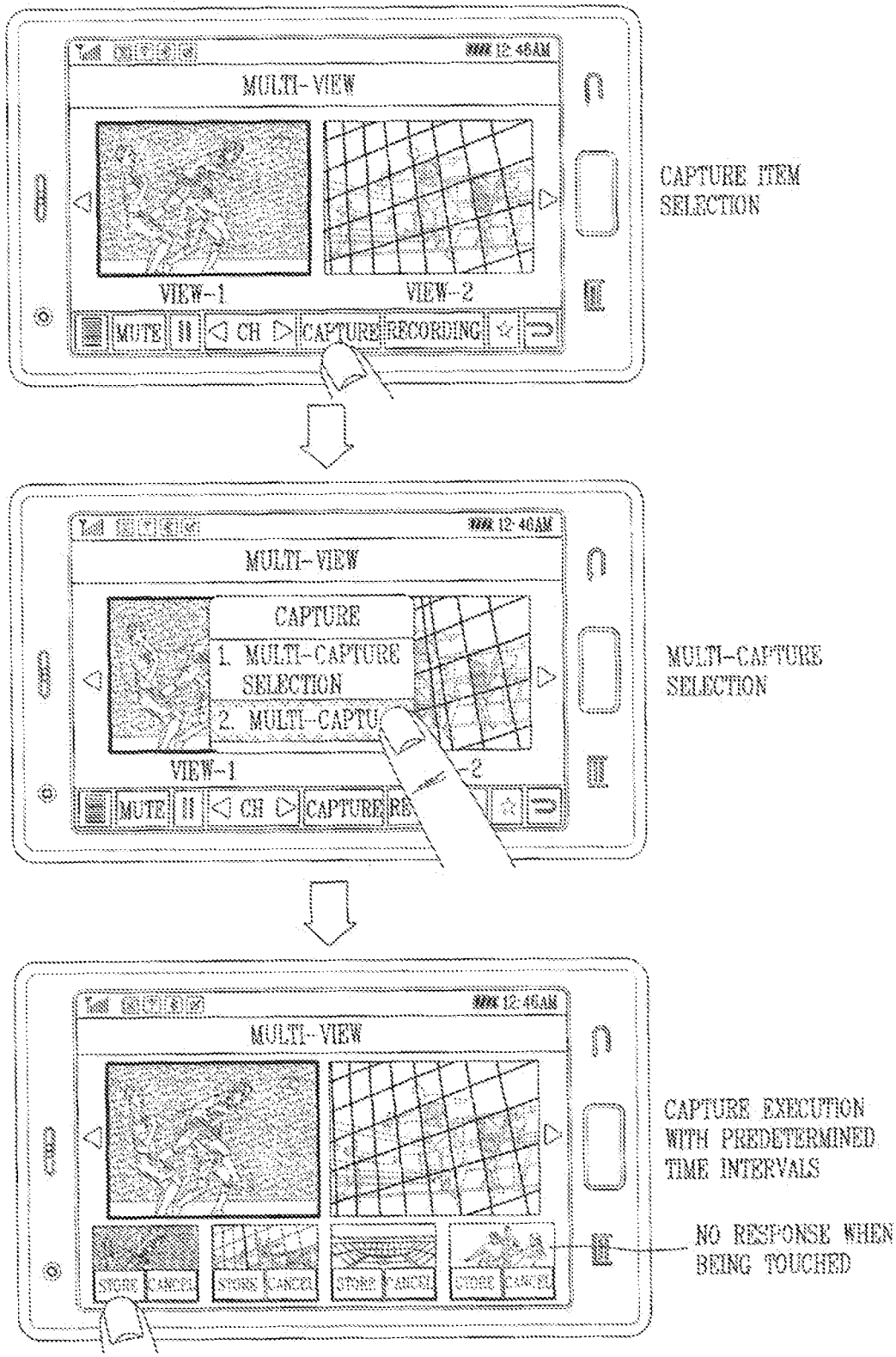

FIG. 12
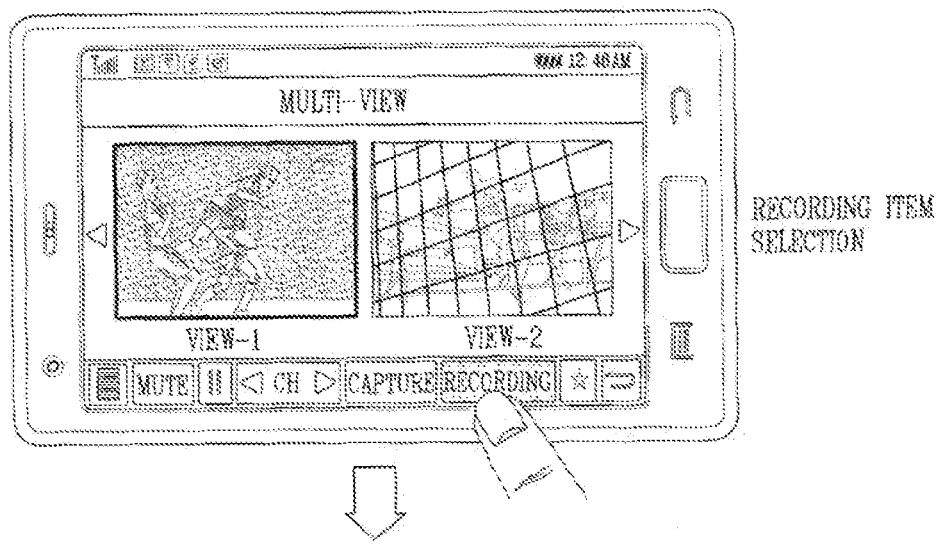
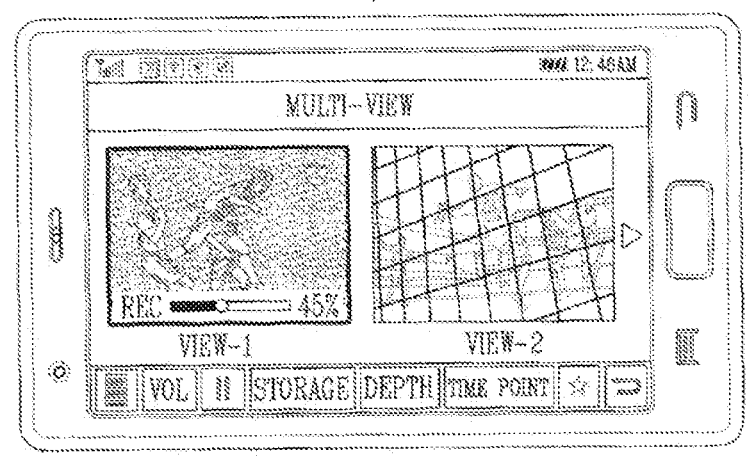
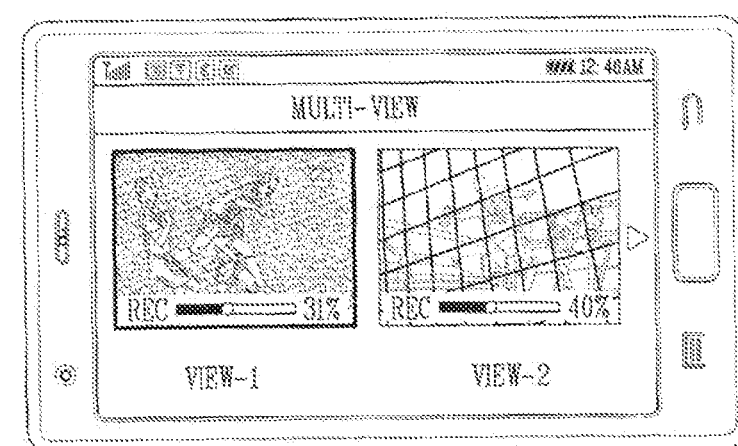
[DISPLAY RECORDING STATE WITH RESPECT TO EACH ANGLE VIEW]

MOBILE TERMINAL AND THREE-DIMENSIONAL (3D) MULTI-ANGLE VIEW CONTROLLING METHOD THEREOF

CROSS-REFERENCE TO RELATED APPLICATION

Pursuant to 35 U.S.C. §119, this application claims the benefit of Korean Application No. 10-2011-0032915, filed on Apr. 8, 2011, the contents of which is hereby incorporated by reference herein in its entirety.

BACKGROUND OF THE INVENTION

1. Field of the Invention

This specification relates to a mobile terminal, and more particularly, to a mobile terminal capable of controlling a multi-angle view with respect to a three-dimensional (3D) stereoscopic image simultaneously captured by a plurality of cameras, and a 3D multi-angle view controlling method thereof.

2. Background of the Invention

In general, a mobile terminal is configured to perform various functions. These various functions include video and voice call communications, still or moving images capturing using a camera, voice storing, music file reproducing through a speaker system, image or video displaying, etc. Some mobile terminals include additional functions such as playing games, and other mobile terminals are implemented as multimedia players. Moreover, recent mobile terminals are configured to allow a user to view video or television programs by receiving broadcasting or multicast signals.

Various attempts have been made to implement enhanced functions of the mobile terminal not only by structural improvements, but also by hardware or software improvements.

A touch function of the mobile terminal allows even a user having a difficulty in inputting buttons or keys to conveniently operate the mobile terminal, by using a touch screen. Recently, this touch function is considered as an important function of the mobile terminal, together with a User Interface (UI) as well as simple input. Accordingly, developing a suitable UI is required more.

Recently, a mobile terminal is being developed to display a 3D stereoscopic image for depth perception or stereovision, as well as to display a 2D image. According to this trend, not only films and televisions but also mobile terminals are designed to implement contents as a 3D image.

A 3D multi-angle service indicates a stereo service which allows a user to view an image simultaneously captured by a plurality of cameras with using his or her preferred camera. Generally, a user may selectively view the entire stage or a specific person or place by selecting an image of a desired camera when enjoying sports, musical performance, etc.

Currently, efforts to apply the 3D multi-angle service to various fields are undergoing, and contents suitable for the service are being developed. However, there has been proposed no user interface (UI) relating to the 3D multi-angle service.

SUMMARY OF THE INVENTION

Therefore, an aspect of the detailed description is to provide a mobile terminal capable of controlling various 3D multi-angle views in a touch manner, and a 3D multi-angle view controlling method thereof.

Another aspect of the detailed description is to provide a mobile terminal capable of efficiently searching and classifying information relating to a 3D multi-angle view, and a 3D multi-angle view controlling method thereof.

Still another aspect of the detailed description is to provide a mobile terminal capable of controlling various operations relating to a 3D image in a state of a 3D multi-angle view, and a 3D multi-angle view controlling method thereof.

To achieve these and other advantages and in accordance with the purpose of this specification, as embodied and broadly described herein, there is provided a 3D multi-angle view controlling method of a mobile terminal, the method comprising: displaying a 3D stereoscopic image including a multi-angle; sensing a touch input; determining a display type of a multi-angle according to the sensed touch input, and displaying multi-angle views of the 3D stereoscopic image as the determined display type; and displaying a 3D stereoscopic image of a specific angle view selected from the multi-angle views.

The touch input may indicate an input sensed at the center of a 3D image screen or an angle icon, and include touch and drag operations in the form of a straight line, a quadrangle and a circle.

The display type of the multi-angle view may include a segregated view, a gallery view, a PIP view and a stadium view.

In a case where a multi-angle is included in the 3D stereoscopic image, angle identification information may be displayed on one side of a screen of the 3D stereoscopic image.

The angle identification information may include an icon, an icon and a text (the number of cameras and a theme), a still image, a moving image and a text. The multi-angle view may include angle information such as an audience rating, a picture quality, a transmission state, movement information, the number of sensed persons and website information according to each angle.

The multi-angle view controlling method of a mobile terminal may further comprise switching the displayed multi-angle views of the 3D stereoscopic image (broadcast image) according to a user's input and a terminal's motion.

The user's input may include a key input, a proximity touch input and a direct touch input, and the terminal's motion may include horizontal and vertical movements and rotations.

The proximity touch input and the direct touch input may include a single touch, a touch and drag and a touch flicking.

In a case where the multi-angle view is implemented as a segregated view, the angle view may be switched by touching or touching and flicking bidirectional switching icons provided at right and left sides of the multi-angle view, by moving the mobile terminal in X, Y and Z directions, and by inputting numeric keys or numeric buttons.

In a case where the multi-angle view is implemented as a PIP view, PIP angle views except for a main angle view may be switched with a predetermined time interval.

In a case where the multi-angle view is implemented as a stadium view, the angle view may be switched through a direct touch or according to a rotation degree of the mobile terminal.

In a case where the multi-angle view is implemented as a gallery view, image type of angle views may be switched by touching an angle switch in one direction.

To achieve these and other advantages and in accordance with the purpose of this specification, as embodied and broadly described herein, there is also provided a mobile terminal, comprising: a display unit configured to display a 3D stereoscopic image including a multi-angle; a sensing unit configured to sense a touch input; and a controller configured to determine a display type of a multi-angle according to the sensed touch input, and to display multi-angle views of the 3D stereoscopic image as the determined display type.

The touch input may indicate an input sensed at the center of a 3D image screen or an angle icon, and include touch and drag operations in the form of a straight line, a quadrangle and a circle. And, the display type of the multi-angle view may include a segregated view, a gallery view, a PIP view and a stadium view.

The controller may be configured to display a 3D stereoscopic image (broadcast image) of a specific angle view selected from the displayed multi-angle views.

The controller may check whether a multi-angle has been included in a 3D stereoscopic image, and display angle identification information on one side of the 3D stereoscopic image when a multi-angle has been included in the 3D stereoscopic image.

The angle identification information may include an icon, an icon and a text (the number of cameras and a theme), a still image, a moving image and a text. And, the controller may display, on the multi-angle view, angle information such as an audience rating, a picture quality, a transmission state, movement information, the number of sensed persons and website information according to each angle.

The controller may switch the displayed multi-angle views of the 3D broadcast image according to a user's input or a terminal's motion.

The user's input may include a key input, a proximity touch input and a direct touch input, and the terminal's motion may include horizontal and vertical movements and rotations. The proximity touch input and the direct touch input may include a single touch, a touch and drag and a touch flicking.

In a case where the multi-angle view is implemented as a segregated view, the controller may switch the angle view by touching or touching and flicking bidirectional switching icons provided at right and left sides of the multi-angle view, by moving the mobile terminal in X, Y and Z directions, and by inputting numeric keys or numeric buttons.

In a case where the multi-angle view is implemented as a PIP view, the controller may switch PIP angle views except for a main angle view with a predetermined time interval.

In a case where the multi-angle view is implemented as a stadium view, the controller may switch the angle view through a direct touch or according to a rotation degree of the mobile terminal.

In a case where the multi-angle view is implemented as a gallery view, the controller may switch image type of angle views by touching an angle switch in one direction.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 5A and 5B are view each illustrating a stadium view, a type of a multi-angle view according to the present invention;

FIGS. 9A and 9B are views illustrating an example to perform an angle view conversion with using numeric keys, and to select a specific angle view in a long press or long touch manner according to the present invention;

FIG. 11 is a view illustrating an example to execute a capture function in a multi-angle display state according to the present invention;

FIG. 12 is a view illustrating an example to execute a recording function in a multi-angle display state according to the present invention;

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal according to the present invention will be explained in more detail with reference to the attached drawings. The suffixes attached to components of the wireless speaker, such as 'module' and 'unit or portion' were used for facilitation of the detailed description of the present invention. Therefore, the suffixes do not have different meanings from each other.

A terminal may be implemented in various types. For instance, the terminal in the present description includes a mobile terminal such as a portable phone, a smart phone, a notebook computer, a digital broadcasting terminal, Personal Digital Assistants (PDA), Portable Multimedia Player (PMP), a navigation system, and a fixed terminal such as a digital TV, a desktop computer, etc. It is assumed that the terminal of the present invention is a mobile terminal. However, it will be obvious to those skilled in the art that the present invention may be also applicable to the fixed terminal, except for specific configurations for mobility.

Figure 1:
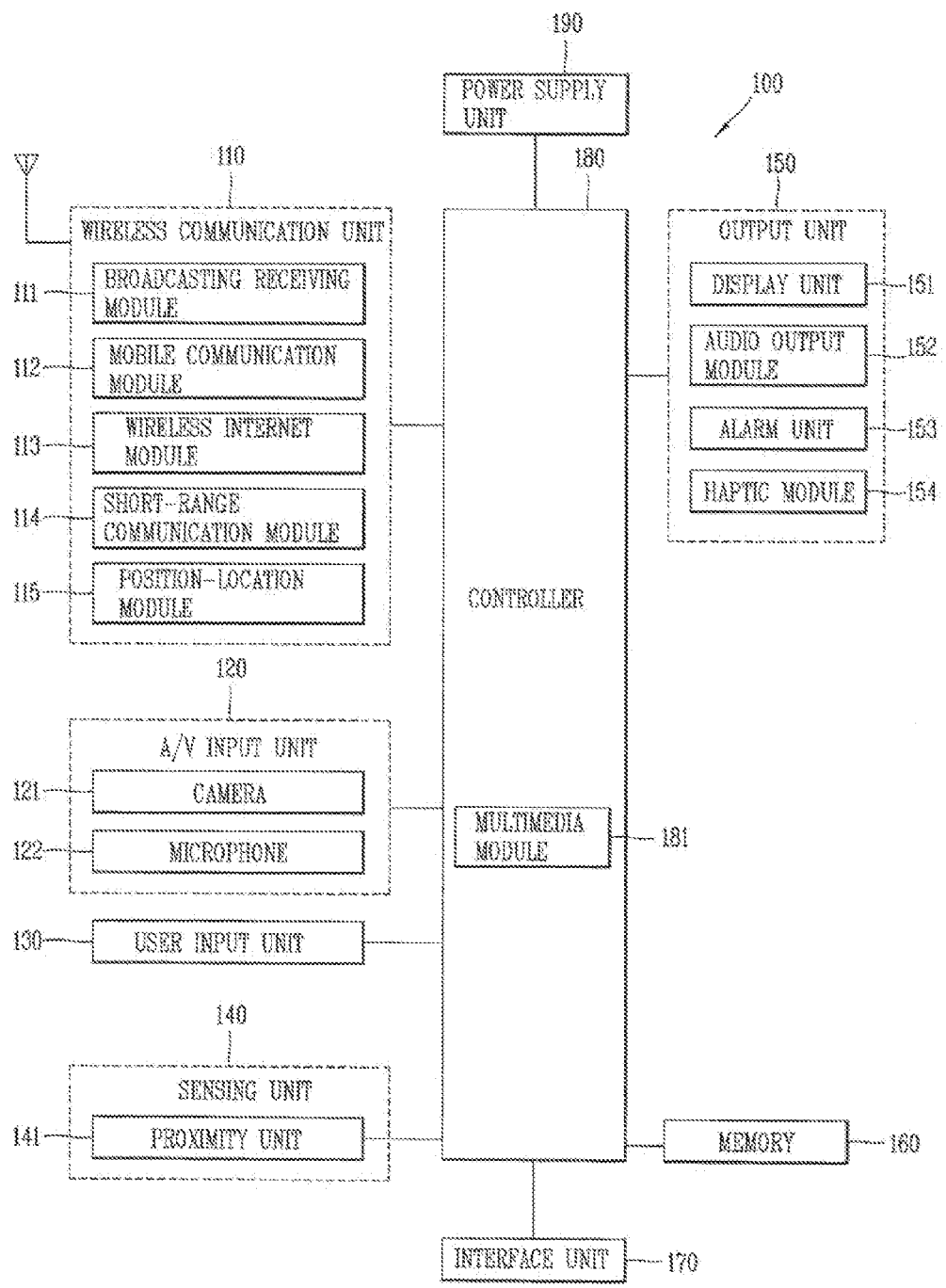
FIG. 1 is a block diagram of a mobile terminal according to a first embodiment of the present invention.

FIG. 1 is a block diagram of a mobile terminal according to an embodiment of the present invention.

As shown in FIG. 1, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or anther type of storage medium).

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile communication terminal. For example, the location information module 115 may include a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore the GPS module may acquire speed information by real time calculating a current position.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 detects a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141, which will be later explained with relation to a touch screen.

The sensing unit 140 includes a geomagnetic sensor configured to calculate a moving direction when a user moves, a gyro sensor configured to calculate a rotation direction, and an acceleration sensor configured to calculate a moving distance by multiplying a user's stride (pace) by the number of a user's steps.

The interface unit 170 serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like.

Here, the identification module may be a memory chip that stores various information for authenticating user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection mechanisms. The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile terminal 100 is connected with an external cradle, the interface unit 170 may serve as a conduit to allow power from the cradle to be supplied therethrough to the mobile terminal 100 or may serve as a conduit to allow various command signals inputted from the cradle to be transferred to the mobile terminal therethrough. Various command signals or power inputted from the cradle may operate as signals for recognizing when the mobile terminal is properly mounted on the cradle.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

When the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of these displays may be configured to be transparent so that outside may be seen therethrough, which may be referred to as a transparent display. A representative example of this transparent display may include a transparent organic light emitting diode (TOLED), etc. The mobile terminal 100 may include two or more display units 151. For example, the mobile terminal may include both an external display unit (not shown) and an internal display unit (not shown). The touch screen may be configured to detect a touch input pressure as well as a touch input location and a touch input area.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, and so on.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. The video signal or the audio signal may be output via the display unit 151 or the audio output module 153. Accordingly, the display unit 151 or the audio output module 153 may be classified as a part of the alarm unit 154.

The haptic module 155 generates various tactile effects which a user can feel. A representative example of the tactile effects generated by the haptic module 155 includes vibration. Vibration generated by the haptic module 155 may have a controllable intensity, a controllable pattern, and so on. For instance, different vibration may be output in a synthesized manner or in a sequential manner.

The haptic module 155 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may be configured to transmit tactile effects (signals) through a user's direct contact, or a user's muscular sense using a finger or a hand. The haptic module 155 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Hereinafter, will be explained a method for processing a user's input to the mobile terminal.

The user input unit 130 is manipulated to receive a command for controlling the operation of the mobile terminal 100, and may include a plurality of manipulation units. The manipulation units may be referred to as manipulating portions, and may include any type of ones that can be manipulated in a user's tactile manner.

Various types of visible information may be displayed on the display unit 151. Such information may be displayed in several forms, such as character, number, symbol, graphic, icon or the like. Alternatively, such information may be implemented as a 3D stereoscopic image.

For input of the information, at least one of characters, numbers, graphics or icons may be arranged and displayed in a preset configuration, thus being implemented in the form of a keypad. Such keypad may be called 'soft key.'

The display unit 151 may be operated as a single entire region or by being divided into a plurality of regions. For the latter, the plurality of regions may cooperate with one another.

For example, an output window and an input window may be displayed at upper and lower portions of the display unit 151, respectively. Soft keys representing numbers for inputting telephone numbers or the like may be output on the input window. When a soft key is touched, a number or the like corresponding to the touched soft key is output on the output window. Upon manipulating the manipulation unit, a call connection for a telephone number displayed on the output window is attempted, or a text output on the output window may be input to an application.

In addition to the input manner illustrated in the embodiments, the display unit 151 or the touch pad may be scrolled to receive a touch input. A user may scroll the display unit 151 or the touch pad to move a cursor or pointer positioned on an object (subject), e.g., an icon or the like, displayed on the display unit 151. In addition, in case of moving a finger on the display unit 151 or the touch pad, the path of the finger being moved may be visibly displayed on the display unit 151, which can be useful upon editing an image displayed on the display unit 151.

One function of the mobile terminal may be executed in correspondence with a case where the display unit 151 (touch screen) and the touch pad are touched together within a preset time. An example of being touched together may include clamping a body with the user's thumb and index fingers. The one function, for example, may be activating or deactivating of the display unit 151 or the touch pad.

Figure 2A:
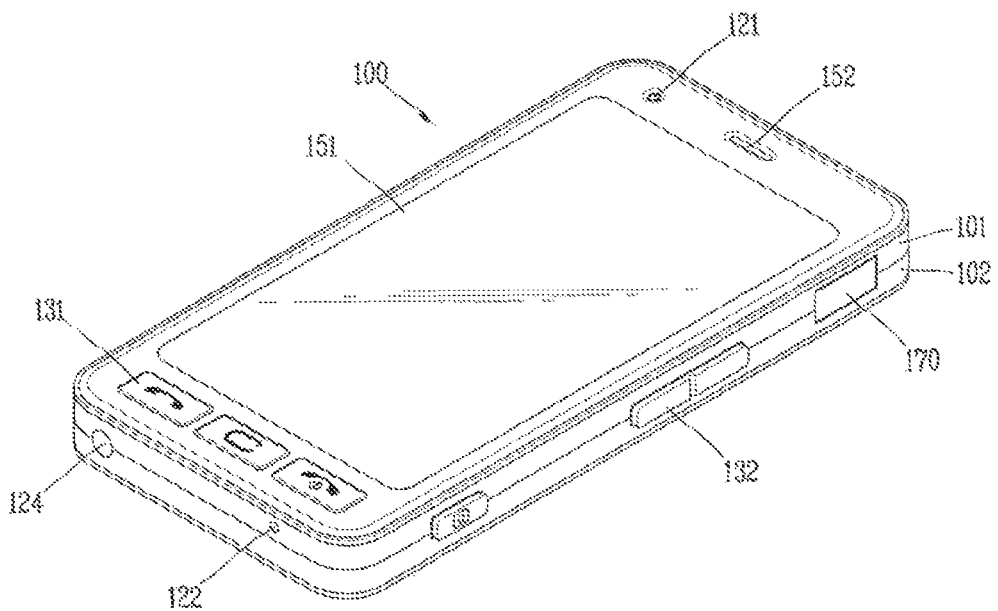
FIGS. 2A and 2B are conceptual views illustrating an operation example of a mobile terminal according to the present invention.

Hereinafter, a hardware configuration of the mobile terminal will be explained in more details with reference to FIGS. 2A and 2B. FIG. 2A is a front perspective view of the mobile terminal according to the present invention, and FIG. 2B is a rear perspective view of the mobile terminal of FIG. 2A.

Figure 2B:
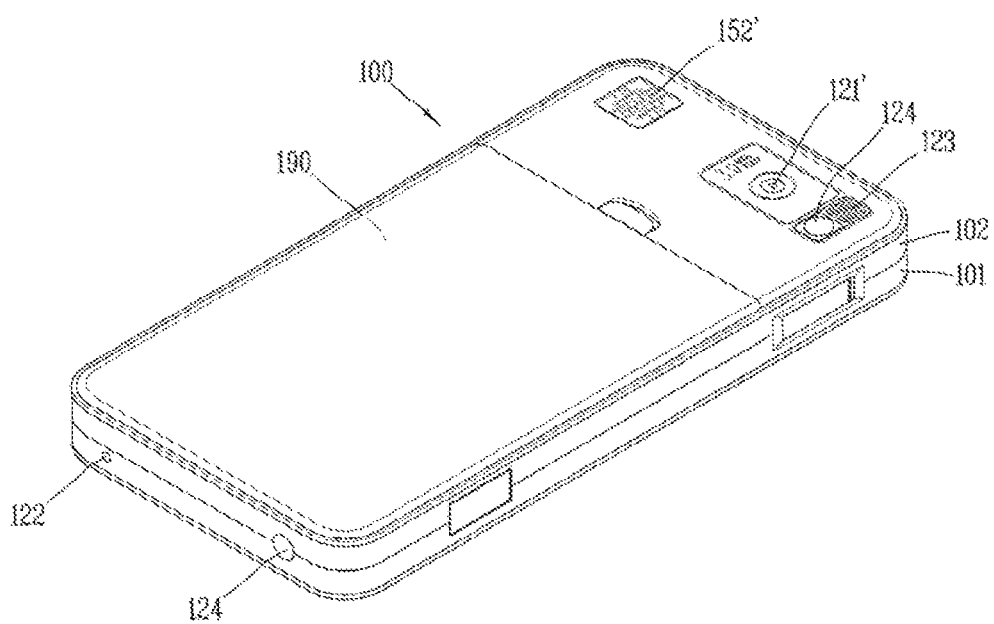

As shown in FIGS. 2A and 2B, the mobile terminal 200 is a bar type mobile terminal. However, the present disclosure is not limited to this, but may be applied to a slide type in which two or more bodies are coupled to each other so as to perform a relative motion, a folder type, or a swing type, a swivel type and the like.

A case (casing, housing, cover, etc.) forming an outer appearance of a body may include a front case 201 and a rear case 202. A space formed by the front case 201 and the rear case 202 may accommodate various components therein. At least one intermediate case may further be disposed between the front case 201 and the rear case 202.

Such cases may be formed by injection-molded synthetic resin, or may be formed using a metallic material such as stainless steel (STS) or titanium (Ti).

At the front case 201, may be disposed a stereoscopic display unit 252, a sensing unit 240, an audio output unit 253, a camera 221, user input units 230/231 and 232, a microphone 222, an interface unit 270, etc.

The stereoscopic display unit 252 occupies most parts of a main surface of the front case 201. The audio output unit 253 and the camera 221 are arranged at a region adjacent to one end of the stereoscopic display unit 252, and the user input unit 231 and the microphone 222 are arranged at a region adjacent to another end of the stereoscopic display unit 252. The user input unit 232, the interface unit 270, etc. may be arranged on side surfaces of the front case 201 and the rear case 202.

The user input unit 230 is manipulated to receive a command for controlling the operation of the mobile terminal 200, and may include a plurality of manipulation units 231 and 232. The manipulation units may be referred to as manipulating portions, and may include any type of ones that can be manipulated in a user's tactile manner.

Commands inputted through the first or second user input units 231 and 232 may be variously set. For instance, the first manipulation 231 is configured to input commands such as START, END, SCROLL or the like, and the second manipulation unit 232 is configured to input commands for controlling a level of sound outputted from the audio output unit 253, or commands for converting the current mode of the stereoscopic display unit 252 to a touch recognition mode. The stereoscopic display unit 252 implements a stereoscopic touch screen together with the sensing unit 240, and the stereoscopic touch screen may be an example of the user input unit 230.

The sensing unit 240 is configured to sense a user's position. Furthermore, the sensing unit 240 serving as a 3D sensor is configured to sense a 3D position of an object to be sensed, the object which performs a touch input (e.g., user's finger or stylus pen). The sensing unit 240 may consist of a camera 221 and a laser sensor 244. The laser sensor 244 is mounted to the terminal body, and is configured to irradiate a laser and to sense a reflected laser. Under this configuration, the laser sensor 244 may sense a distance between the terminal body and an object to be sensed. The camera 221 is configured to capture 2D positions of a user and an object to be sensed (refer to FIG. 2A).

For instance, the mobile terminal may sense a user's 2D position based on an image captured through the camera 221, thereby recognizing an image being currently viewed by the user. Furthermore, the mobile terminal may sense a 3D position of an object to be sensed, by combining an object's 2D position captured by the camera 221 with a spacing distance acquired by the laser sensor 244. If a user's 2D image is required (refer to FIG. 2), the sensing unit 240 may consist of only the camera 221. However, the present invention is not limited to this. That is, the sensing unit 240 may consist of a proximity sensor, a stereoscopic touch sensing unit, a supersonic sensing unit, etc.

Referring to FIG. 2B, a camera 221' may be additionally provided on the rear case 202. The camera 221' faces a direction which is opposite to a direction faced by the camera 221, and may have different pixels from those of the camera 221.

For example, the camera 221 may operate with relatively lower pixels (lower resolution). Thus, the camera 221 may be useful when a user can capture his face and send it to another party during a video call or the like. On the other hand, the camera 221' may operate with a relatively higher pixels (higher resolution) such that it can be useful for a user to obtain higher quality pictures for later use. The cameras 221 and 221' may be installed at the body so as to rotate or pop-up.

A flash 223 and a mirror 224 may be additionally disposed adjacent to the camera 221'. The flash 223 operates in conjunction with the camera 221' when taking a picture using the camera 221'. The mirror 224 can cooperate with the camera 221' to allow a user to photograph himself in a self-portrait mode.

An audio output unit may be additionally arranged on a rear surface of the body. The audio output unit may cooperate with the audio output unit 253 (refer to FIG. 3A) disposed on a front surface of the body so as to implement a stereo function. Also, the audio output unit may be configured to operate as a speakerphone.

A power supply unit 290 for supplying power to the mobile terminal 200 is mounted to the terminal body. The power supply unit 290 may be mounted in the terminal body, or may be detachably mounted to the terminal body.

At the terminal body, may be arranged not only an antenna for calling, but also an antenna for receiving a broadcasting signal, a Bluetooth antenna, an antenna for receiving a satellite signal, an antenna for receiving wireless Internet data, etc.

The mobile terminal 100 shown in FIG. 1 may include a wired or wireless communications system and a satellite-based communications system, and may operate in a communications system for transferring data through a frame or a packet.

3D Stereoscopic Image

Generally, a 3-dimensional stereoscopic image (hereinafter, will be referred to as 3D image) indicates an image capable of allowing a viewer to view depth and reality of an object disposed on a monitor or a screen as if in the real space. This 3D image is implemented by using binocular disparity. The binocular disparity indicates a parallax formed by two eyes. When a user's two eyes view different 2D images, and the images are transmitted to the user's brain through a retina. Then, the images are merged to each other to allow the user to feel depth and reality of the stereoscopic image.

The 3D image may be displayed by a display method such as a stereoscopic method (with-glasses), an auto stereoscopic method (glasses-free) and a projection method (holographic method). The stereoscopic method is mainly applied to a television receiver for home use, and includes a Wheatstone stereoscopic method. The auto stereoscopic method is mainly applied to a mobile terminal, etc., and includes a parallax barrier method and a lenticular method. And, the projection method includes a reflective holographic method, a transmissive holographic method, etc.

Creation and Display of 3D Image

Generally, a 3D image consists of a left eye image (image viewed through a left eye) and a right eye image (image viewed through a right eye). A method for synthesizing the left eye image and the right eye image with each other as a 3D stereoscopic image may include a top-down method, an L-to-R (left-to-right, side by side) method, a checker board method, an interlaced method, a time sequential (frame by frame) method, etc. According to the top-down method, the right and left images are arranged in up and down directions in one frame. According to the L-to-R method, the right and left images are arranged in right and left directions in one frame. According to the checker board method, pieces of the right and left images are arranged in the form of tiles. According to the interlaced method, the right and left images are alternately arranged in the unit of rows or columns. And, according to the interlaced method, the right and left images are alternately arranged per hour.

As aforementioned, the 3D multi-angle service indicates a stereoscopic service which allows a user to view an image simultaneously captured by a plurality of cameras through a desired camera.

The present invention provides a method for providing various 3D angle views of a 3D image in a touch manner when enjoying a 3D broadcast service and a VOD (Video on Demand) service with using a mobile terminal. That is, The present invention relates to a method for displaying 3D angle information according to a location of a camera by receiving information on a substantial location of the camera. The 3D angle information includes a preview of a 3D angle, switching between angle views, a control menu with respect to an angle view and other operations (capture, recording and charging). The 3D image includes a 3D broadcast image and 3D contents.

Indication of 3D Multi-Angle View and Types of Angle View

In the present invention, a 3D broadcast is classified into a 3D broadcast (or 3D broadcast image) which supports multi-angle views, and a 3D broadcast which does not support multi-angle views. The controller 180 may check whether a multi-angle has been included in a corresponding 3D broadcast. If a 3D broadcast includes a multi-angle as a result of the check, i.e., if a 3D broadcast supports a multi-angle view, the controller 180 displays a predetermined angle indication at one side of a screen.

The angle indication may be implemented in various manners. For instance, the angle indication may be implemented in the form of an icon, an icon and a text (the number of cameras and theme), a still image, a moving image and a text.

Once the angle indication is touched (directly touched and proximity-touched), the controller 180 divides a screen to display a preview, a text, an image, etc. of each angle. And, the controller 180 displays information on each angle view, e.g., an audience rating, a picture quality, a transmission state, movement information, the number of sensed persons and a relevant website according to each angle. Especially, once a specific touch is input with respect to the angle indication, the controller may immediately access to a web site or display preview information of a web site.

When selecting the angle indication, an angle view of a predetermined type and size is displayed. A type, a size and a shape of the angle view are set through an angle view selection menu. The angle view may be categorized into a segregated view, a PIP (Picture in Picture) view, a stadium view and a gallery view. A type of each angle view may be directly selected from an angle view selection menu, or may be determined based on a drag direction when the angle indication (hereinafter, will be referred to as an angle icon) undergoes a touch and drag operation.

When a specific location on a screen is touched, a type of an angle view may be displayed on a predetermined location. Here, the angle view may be switched in correspondence to a key input.

For instance, when the angle icon is touched and then is dragged in right and left or upper and lower directions, an angle view is displayed as a segregated view. When the angle icon is touched and then is dragged to draw a large quadrangle, an angle view is displayed as a PIP view. When the angle icon is touched and then is dragged to draw a circle, an angle view is displayed as a stadium view. In the case of the segregated view, when the angle icon is dragged in right and left directions, a horizontal segregated view is displayed. On the other hand, when the angle icon is dragged in upper and lower directions, a vertical segregated view is displayed.

In the present invention, the aforementioned respective views are displayed even when performing a touch in the form of a straight line or a quadrangle and a circle at the center of a screen without touching an angle icon. In the present invention, when a view type is changed, e.g., when a view type is changed into a vertical view type from a horizontal view type, a multi-angle view may be displayed to be selected by a user.

Once a specific view type is selected from a plurality of segregated views, may be displayed, on a corresponding preview screen, icons such as a multi-view control menu (icon), a switching icon (icon for moving in upper and lower or right and left directions) and an icon indicating the number of views.

Display of 3D Multi-Angle View

Figure 3:
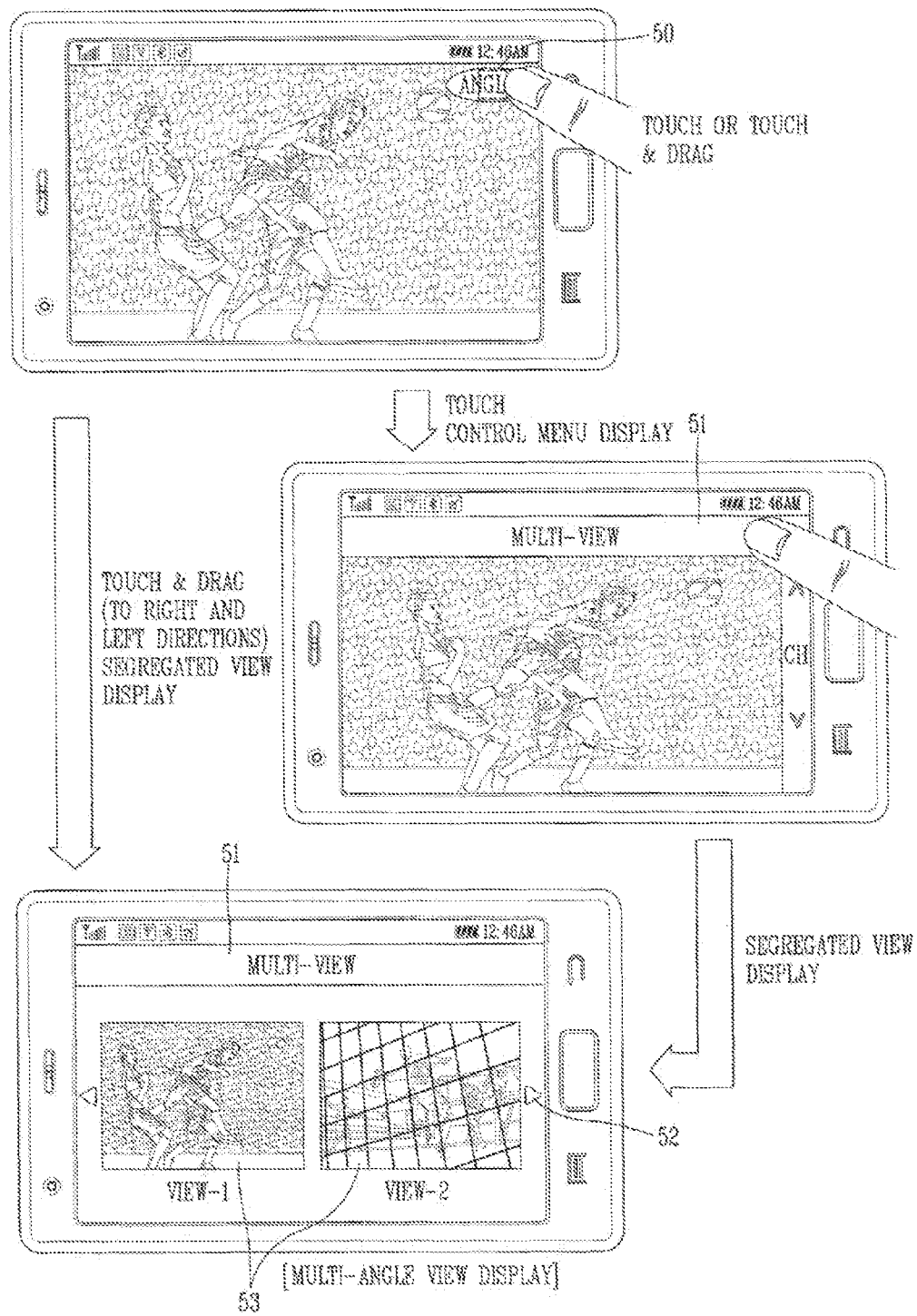
FIG. 3 is a view illustrating a segregated view, a type of a multi-angle view according to the present invention.

FIG. 3 is a view illustrating a segregated view, a type of a multi-angle view according to the present invention. Especially, FIG. 3 illustrates a multi-view when a multi-angle icon is dragged in right and left directions.

As shown in FIG. 3, once a specific 3D image (3D broadcast or 3D contents) is selected by a user, the controller 180 displays an angle indication 50 indicating that a current channel (3D image) supports a multi-angle view. The angle indication 50 is implemented in the form of an icon, an icon and a text (the number of cameras and theme), a still image, a moving image and a text. For convenience, the angle indication 50 is referred to as an 'angle icon'.

Once the angle icon 50 is touched (directly touched and proximity-touched), a multi-view control menu 51 is displayed at one side of a screen, e.g. an upper end of a screen. Then, when the multi-view control menu 51 is tapped (touched), a main view (view 1) displayed on the current screen, and another view (view 2) of a 3D image according to each angle are displayed in a screen-division manner. Here, the view 1 is displayed on the current screen with emphasis (highlight or frame (edge) display).

As another embodiment, when a user touches a corresponding icon on a screen where a multi-angle view icon has been displayed, or when a user touches a point corresponding to the multi-view control menu, previews (view 1 and view 2) of a 3D image according to each angle may be displayed without undergoing a step of displaying the multi-view control menu.

On the preview screen, may be displayed a multi-view image, a multi-view control menu (icon) 61, a switching icon (icon for moving in right and left directions) 52 and icons indicating the number of views (View 1 and View 2).

The switching icon 52 is an icon for switching an angle view. Whenever a left or right switching icon 52 is touched, a new angle view is displayed. In the present invention, two angle views are displayed on one screen in the form of a preview. However, the number of the angle views may be properly changed by a user's setting.

Figure 4:
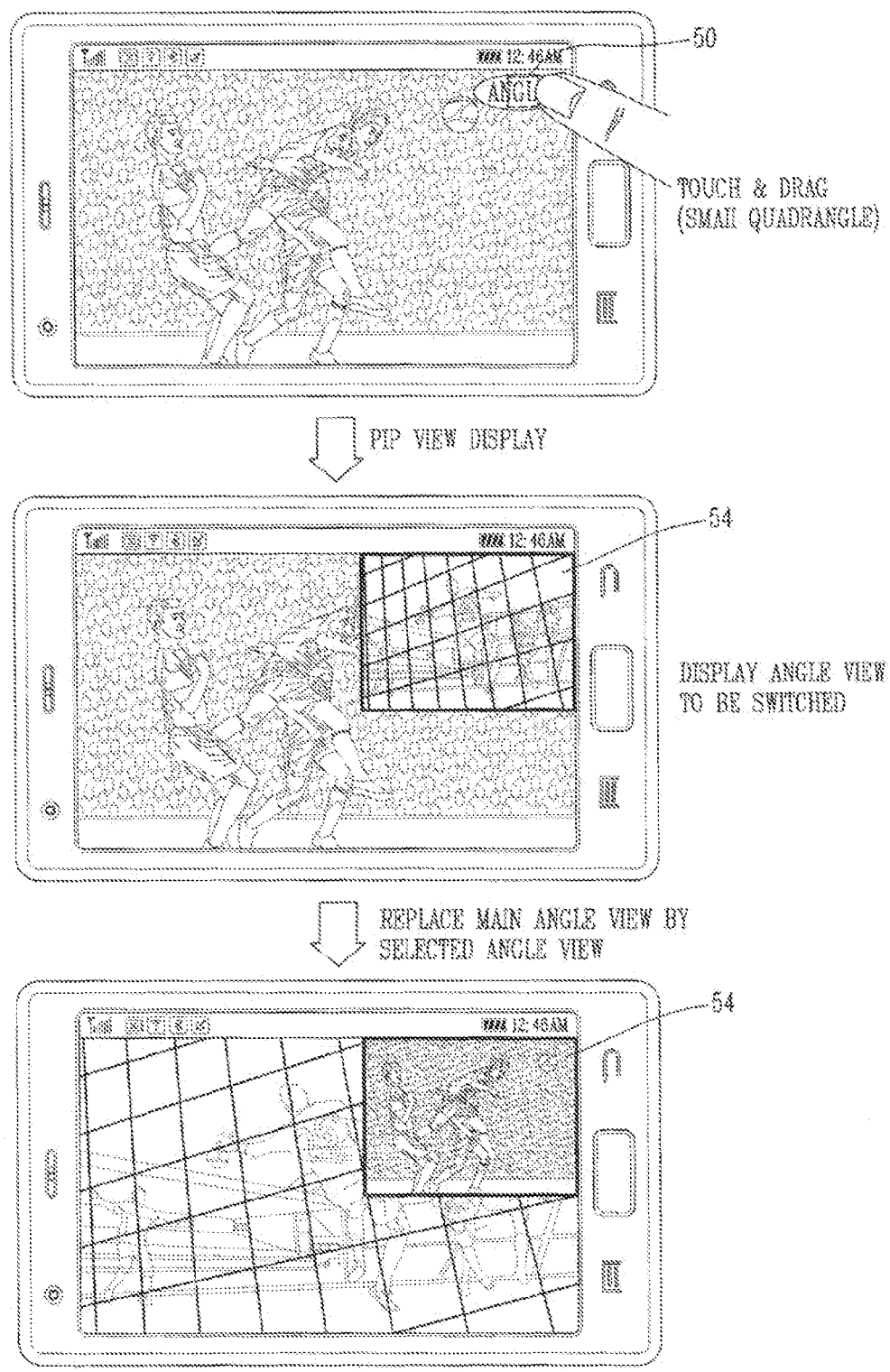
FIG. 4 is a view illustrating a PIP view, a type of a multi-angle view according to the present invention.

FIG. 4 is a view illustrating a PIP view, a type of a multi-angle view according to the present invention.

The PIP view is displayed when the angle icon 50 is touched to draw a small quadrangle. When a user draws a small quadrangle with the angle icon 50, an angle view (view 2), one of a plurality of angle views (sub views) is displayed on a PIP having a predetermined size at a top right end of the main view (view 1).

Switching (conversion) between angle views in the PIP view mode is performed in a PIP. Each angle view is switched in the PIP with a predetermined time interval. When a specific angle view in the PIP is selected by a user during a switching operation, the selected angle view is displayed by being replaced by the main view currently displayed.

Figure 5A:
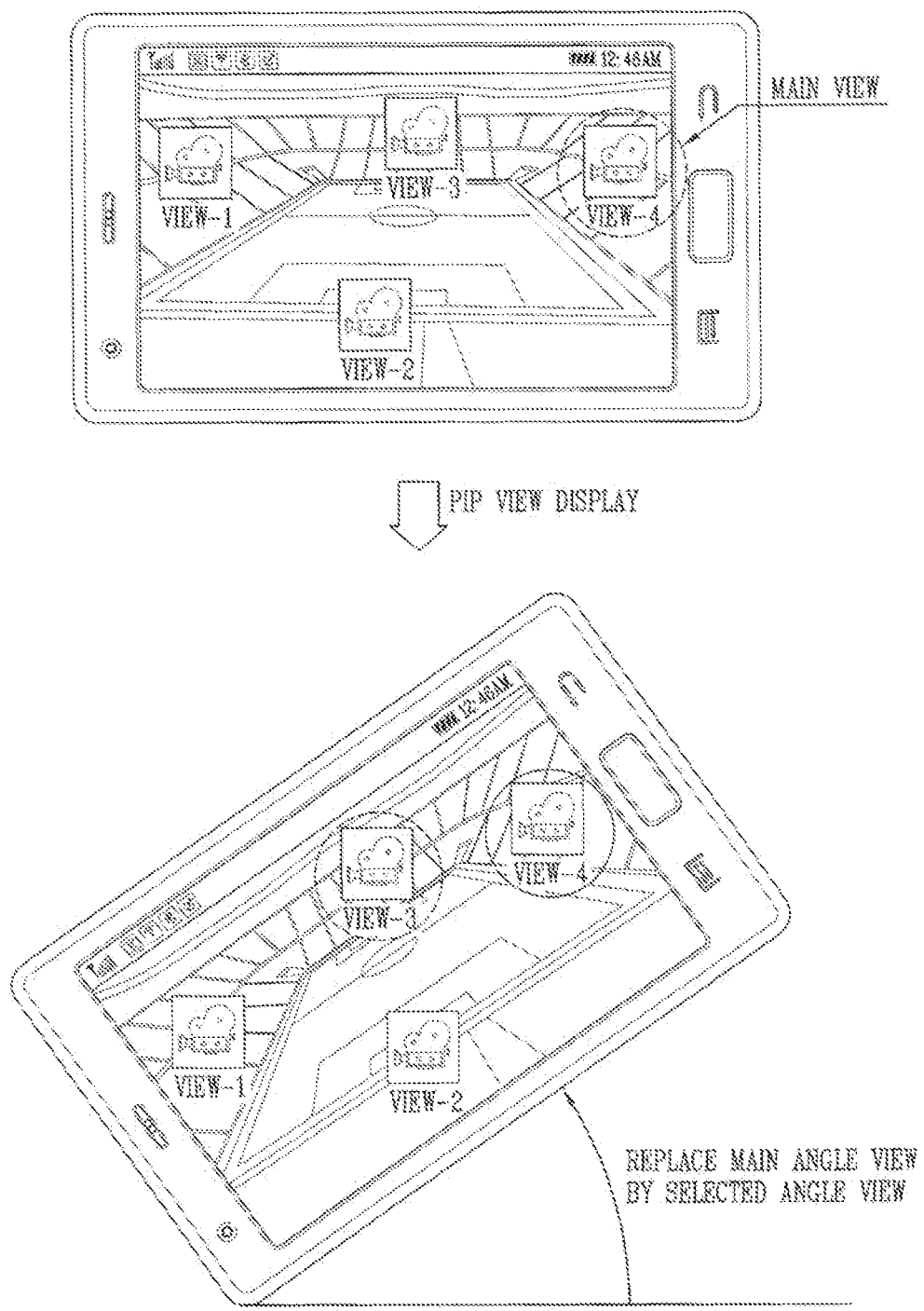

FIGS. 5A and 5B are view each illustrating a stadium view, a type of a multi-angle view according to the present invention. FIG. 5A illustrates an angle view switching when the mobile terminal is rotated in a counterclockwise direction, and FIG. 5B illustrates an angle view switching when the mobile terminal is rotated in a clockwise direction.

The stadium view is displayed when the angle icon 50 is touched and then is dragged to draw a circle. In this case, angle views captured by all cameras are displayed. More concretely, as shown in FIG. 5, on the stadium view, displayed are a main view (view 4) currently selected (viewed) by a user, and viewable (selectable) supplementary views 1~3. Here, angle views captured by a plurality of cameras are arranged in a counterclockwise direction, and the main view is displayed in a different manner from the supplementary views.

Switching (conversion) between angle views on the stadium view may be determined according to a gradient and a gradient direction of the mobile terminal. Once a user rotates the mobile terminal in a clockwise or counterclockwise direction, a gradient sensor or a gyro sensor of the sensing unit 140 senses a rotation direction and a rotation degree of the mobile terminal.

The controller 180 determines an angle view to be displayed on the screen according to the sensed rotation direction and rotation degree, and then displays a 3D image of the angle view. Then, the controller 180 displays, on the screen, not only the main view but also a type of the angle view currently displayed on the screen (circular dotted line). For this, the memory 180 is provided with each angle view set in correspondence to a rotation degree, and a time point when the angle is displayed corresponds to a time point when the rotation of the mobile terminal stopped.

In the present invention, when a user converts a view type to a horizontal view from a vertical view, a multi-view angle is displayed on the screen thus to be selected by the user.

Figure 6:
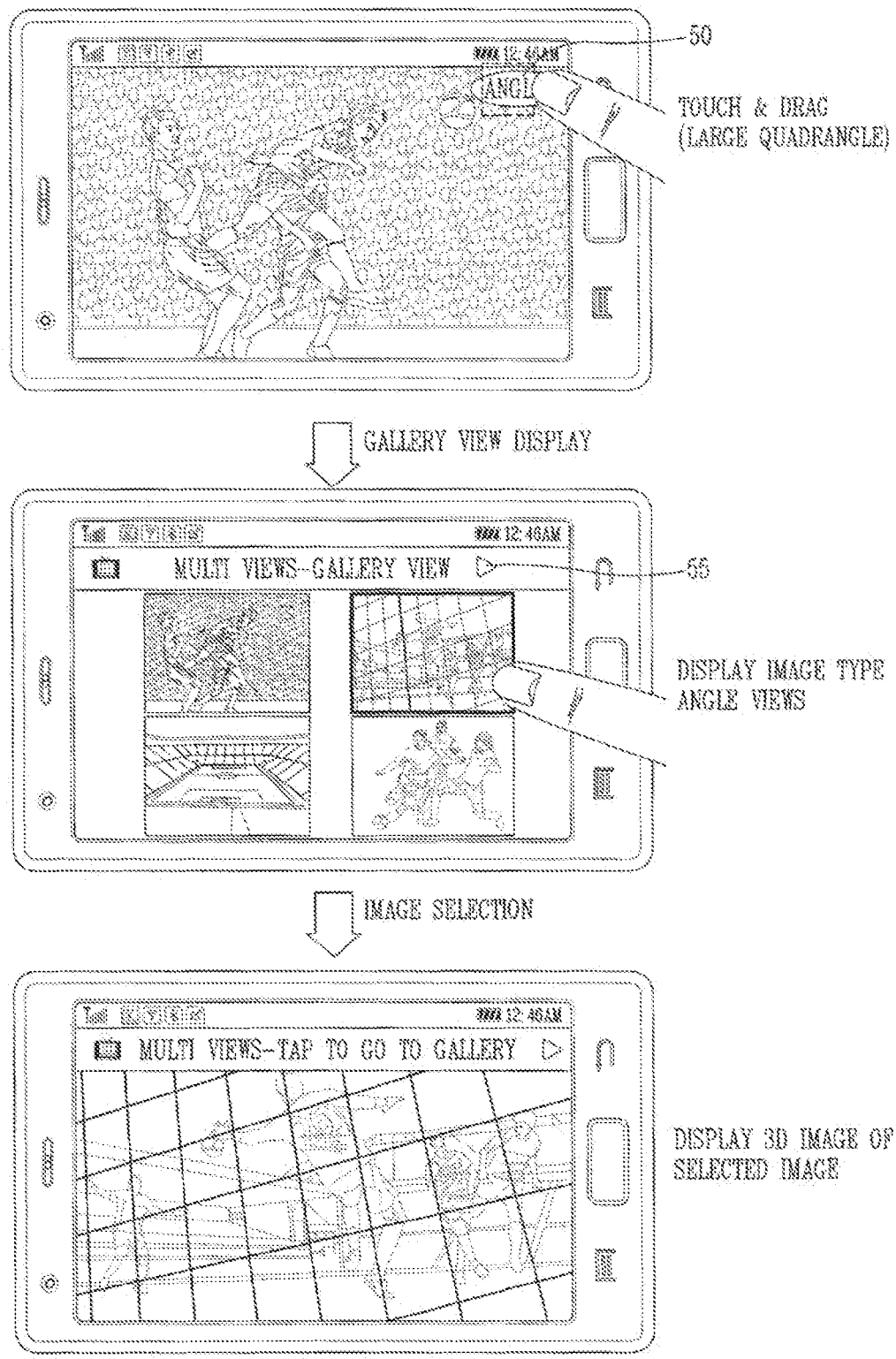
FIG. 6 is a view illustrating a galley view, a type of a multi-angle view according to the present invention.

FIG. 6 is a view illustrating a galley view, a type of a multi-angle view according to the present invention.

As aforementioned, the galley view is displayed when the angle icon 50 is touched and then is dragged to draw a large quadrangle. The gallery view shows all available angle views in the form of an image (jpeg image) (stationary view). In the galley view mode, moving between stationary views and switching (conversion) to another angle view in a state where a specific 3D image has been displayed are performed by using a switching icon 55.

Switching (Conversion) of 3D Multi-Angle View

The aforementioned angle switching (conversion) will be explained in more details.

An angle view switching includes all operations for converting an angle view of a 3D image currently displayed on a screen into another angle view according to a gradient (detected motion) of the mobile terminal or a user's touch input (key input). And, the touch input includes touch, touch and drag, touch gesture and touch flicking, and the angle view switching includes multi-view selection, scrolling and flicking.

In the present invention, when inputting a hot key or a specific key (touching a specific position), only a channel having a multi-angle view may be displayed in a sorting manner. This sorting (classification) may be performed by directly displaying a channel list, or by displaying angle views in the form of images in association with channels.

Once a touch and drag operation is performed by using two fingers on a 3D image screen of a specific angle view, the current channel is converted to another channel having an angle view.

Figure 7A:
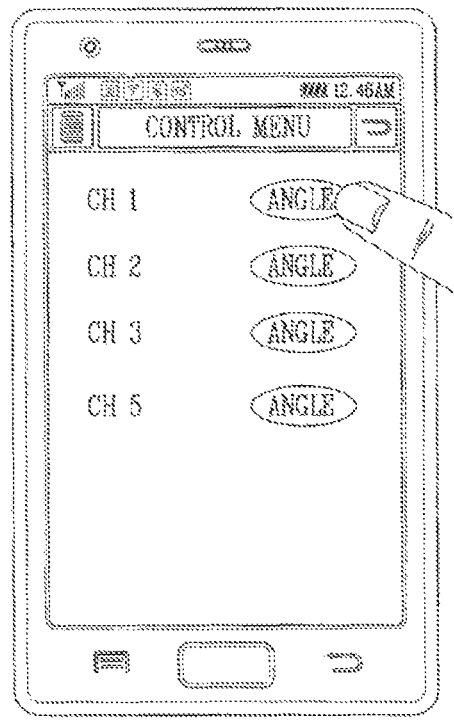
FIGS. 7A and 7B are views illustrating channels having angle views in a sorting manner.
Figure 7B:
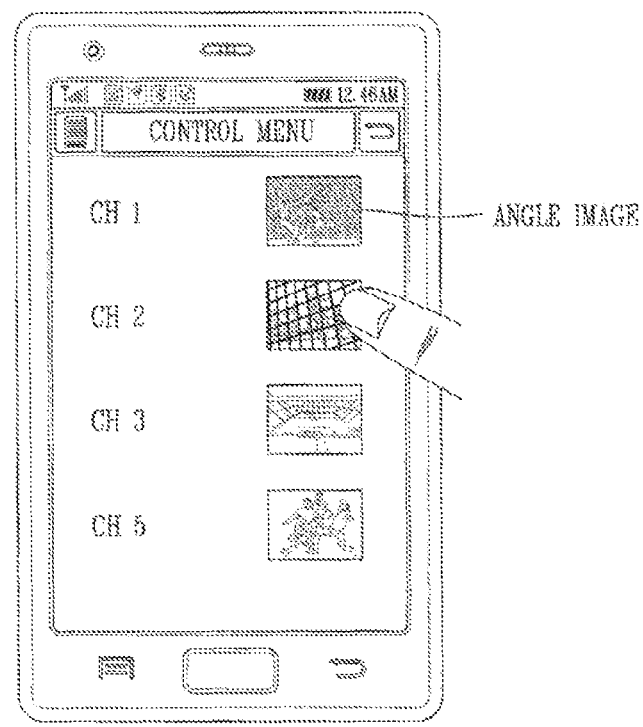

FIGS. 7A and 7B are views illustrating channels having angle views in a sorting manner.

As shown in FIGS. 7A and 7B, once a user touches a hot key or a specific position on a screen or inputs a specific key, the controller 180 displays channels having multi-angle views in the form of a list in a sorting manner. On the channel list, angle icons may be together displayed, or image type angle views may be displayed.

FIGS. 8A to 8D are views illustrating an example to perform a switching with respect to multi-angle views according to the present invention.

In the present invention, multi-angle views may be switched in an automatic manner or in a manual manner. According to the automatic switching method, an angle view is automatically converted with a time interval set by a user (periodically). In case of a PIP view, only an angle view displayed on a PIP is converted. According to the manual switching method, an angle view is converted by a user's touch input.

Figure 8A:
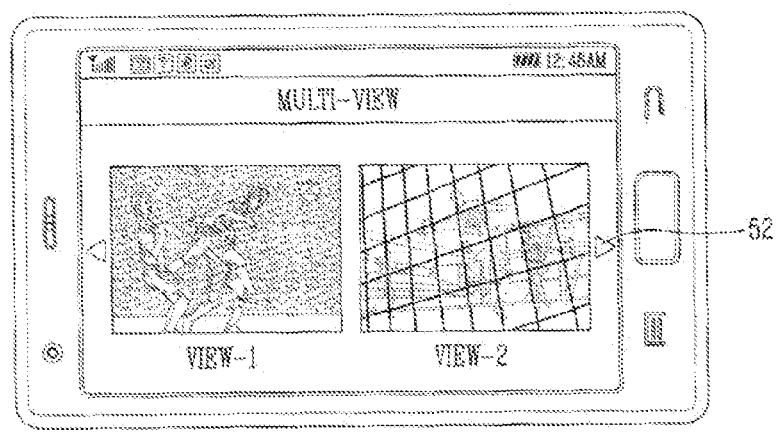
FIGS. 8A to 8D are views illustrating an example to perform a switching operation with respect to multi-angle views according to the present invention.

FIG. 8A is a view illustrating an example to select a desired angle view by moving an angle view (not shown) disposed at the right or left side by touching (tapping) the switching icon 52 a plurality of times by a user.

Figure 8B:
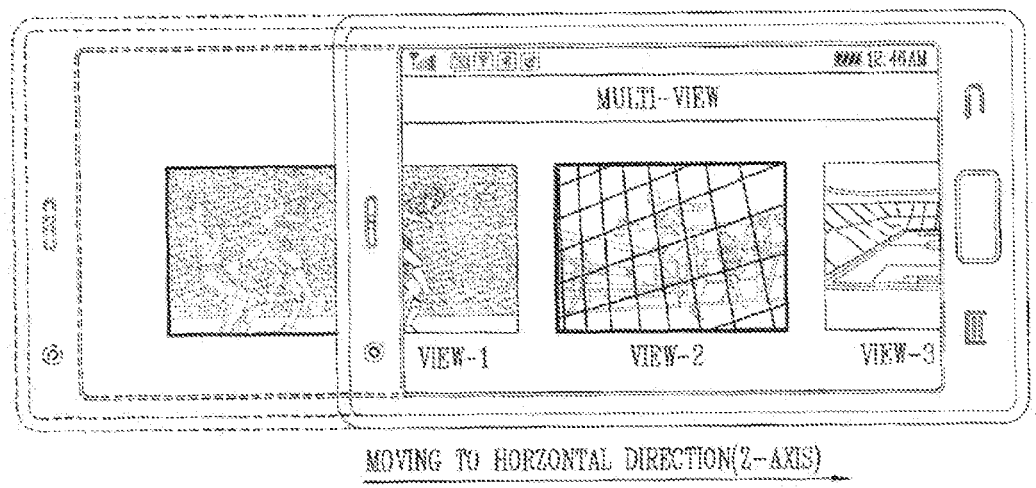
Figure 8C:
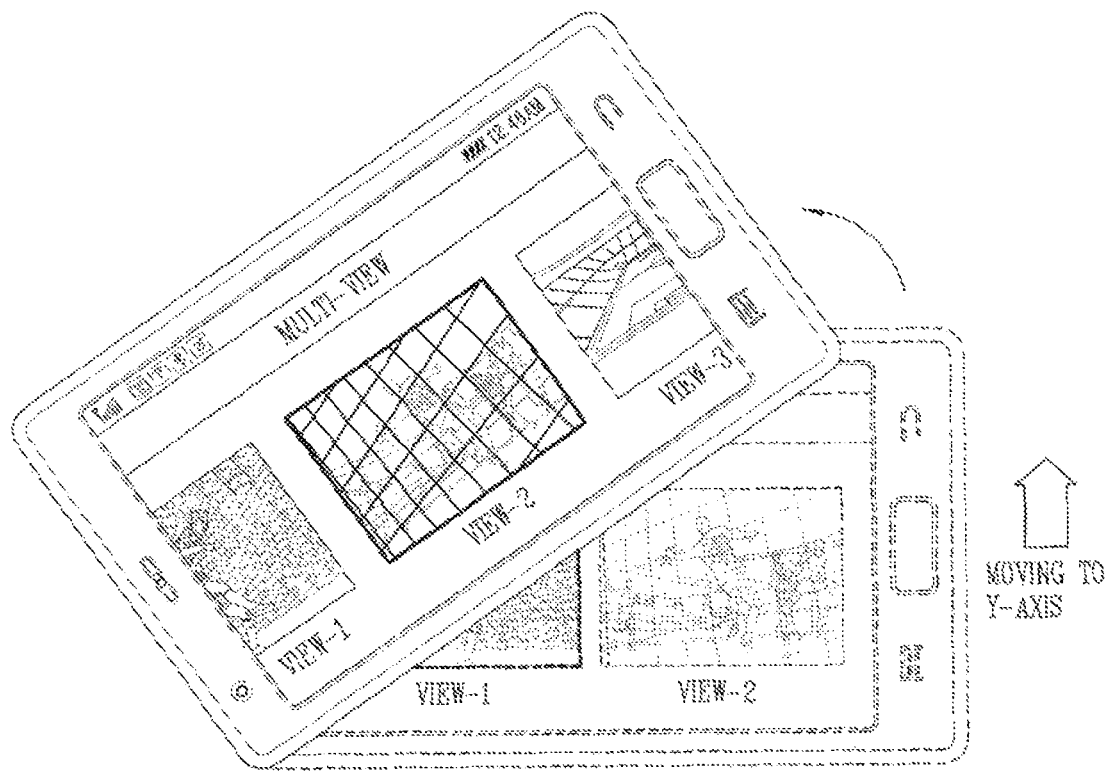

FIGS. 8B and 8C are views illustrating examples to switch angle views based on a sensed motion of the mobile terminal.

As shown in FIG. 8B, once a user moves the mobile terminal to a horizontal direction (X-axis), the sensing unit detects a motion of the mobile terminal. The controller 180 converts the current angle view to a view 2 from a view 1 and displays the view 2 based on a detection result by the sensing unit, e.g., a moving distance.

The mobile terminal may be moved not only in an X-axis direction, but also in a Y or Z-axis direction.

FIG. 8C is a view illustrating an example to switch an angle view based on a sensed motion (rotation) of the mobile terminal in a Y-axis direction. As shown in FIG. 8C, once a user rotates the mobile terminal to a Y-axis direction, the sensing unit converts an angle view to the view 2 from the view 1 according to a rotation angle. If the user selects a specific angle view while converting the multi-angle views, the controller 180 displays a corresponding screen as a main view and displays the rest screens as supplementary views.

Figure 8D:
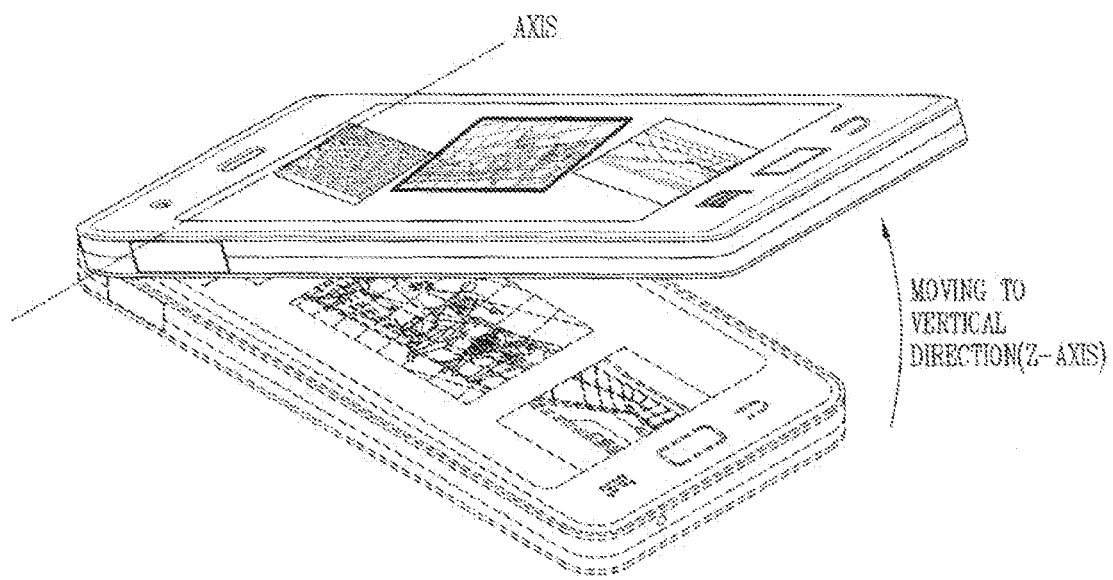

FIG. 8D is a view illustrating an example to switch an angle view based on a sensed motion (rotation) of the mobile terminal in a Z-axis direction. Especially, FIG. 8D is a view where a gravitational effect is reflected to an angle view.

Once a user rotates the mobile terminal to an upper side (Z-axis direction), the sensing unit (gyro sensor) detects an up-down motion of the mobile terminal and displays an angle view based on a motion degree. Here, angle views rather than an angle view corresponding to a rotation angle are slide to a downward direction due to a gravitational effect.

Accordingly, the user searches for a plurality of angle views while moving the mobile terminal in upper and lower directions, and selects a desired angle view in a direct touch manner during the search.

Figure 9B:
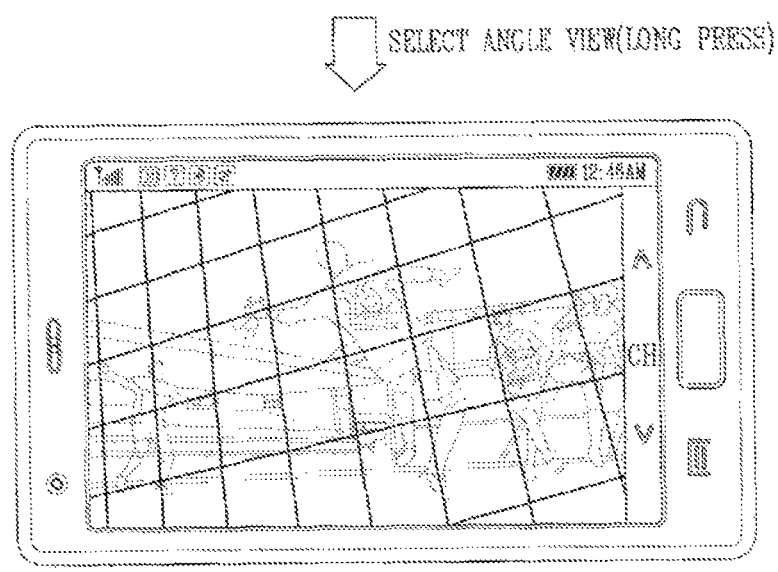

FIGS. 9A and 9B are views illustrating an example to perform an angle view conversion with using numeric keys (or numeric buttons), and to select a specific angle view in a long press or long touch manner according to the present invention. Here, the number of angle views and each number are displayed on a multi-view control menu disposed on an upper end of a screen. When an angle view conversion is performed, the current angle view is displayed.

In another embodiment rather than the aforementioned embodiment, once a preferred channel is multi-touched, an angle view is filtered to be displayed as shown in FIGS. 7A and 7B. Alternatively, once a touch and drag operation using two fingers is performed, the current channel may be converted to a channel having an angle view.

Figure 10A:
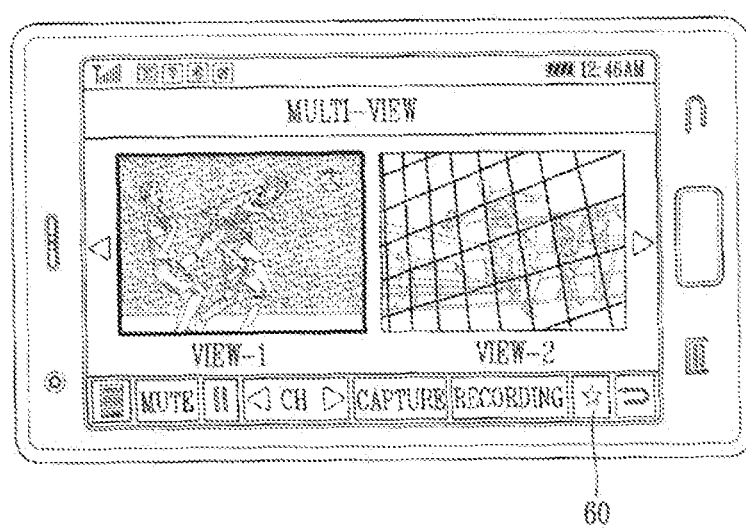
FIGS. 10A and 10B are views each illustrating an example of a control menu with respect to each angle view when displaying a preview on a multi-angle view.
Figure 10B:
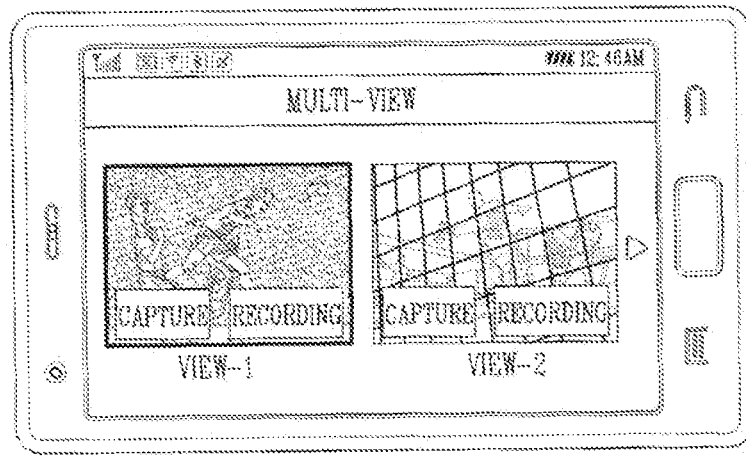

FIGS. 10A and 10B are views each illustrating an example of a control menu with respect to each angle view when displaying a preview on a multi-angle view.

FIG. 10A illustrates an example to display a control menu with respect to one angle view. In a case where an angle view conversion is performed by the aforementioned methods, when a user touches (e.g., double-touches) a predetermined hot key or a lower end of the entire screen (angle view), the controller 180 displays a control menu including operations (capture, recording, channel change, mute and etc.) which can be executed in the current angle view state. Accordingly, the user may select a specific item included in the control menu, thereby performing each operation with respect to the current angle view.

FIG. 10B illustrates an example to display a control menu with respect to a plurality of angle views. When a user simultaneously touches predetermined hot keys or lower ends of the respective angle views with using two fingers, the controller 180 displays a control menu at each lower end of each angle view. When there is a size restriction, a searchable switching bar, etc. may be additionally provided.

FIG. 11 is a view illustrating an example to execute a capture function in a multi-angle display state according to the present invention.

If a user touches a capture item or presses a broadcast hot key for a long time in a state that the control menu of FIG. 10A has been displayed, the controller 180 displays a pop-up for selecting a single capture or a multi-capture with respect to a 3D image displayed in the form of a preview. Once the user selects a multi-capture from the pop-up, the controller 180 consecutively captures a screen with a predetermined time interval (e.g., 0.3 seconds, 0.5 seconds, 0.7 seconds, etc.). Then, the controller 180 displays the captured screen at a lower end of a 3D image screen in the form of a thumbnail. On the other hand, when the user selects a single capture from the pop-up, the controller 180 captures only one screen to display the captured screen at a lower end of a 3D image screen in the form of a thumbnail. Here, the lower end of the thumbnail type 3D image includes a storage menu (storage button) and a cancel menu (back button). And, the thumbnail is part having no response when being touched.

Once the storage menu is selected from the captured 3D image, the captured one or more 3D images are stored in a broadcast storage box of the memory 160. Upon completion of the storage, a message indicating 'storage completed' is displayed on a touch capture region and the rest capture images are processed to be blurred.

In a case where the control menu of FIG. 10B is displayed on each angle view, the controller 180 may select a capture item to execute the same operations. Detailed explanations thereof will be omitted.

FIG. 12 is a view illustrating an example to execute a recording function in a multi-angle display state according to the present invention.

Like in FIG. 10A or 10B, once a user touches a recording item on a control menu or presses a broadcast hot key for a long time, the controller 180 starts to record the current angle, or to record a 3D image with respect to each angle view.

Upon starting to record a 3D image, a message of 'REC' is displayed at a lower end of a specific angle view or a plurality of angle views, together with a storable memory space and a stored degree (%). And, a cancel button (back button), a volume button, a time point change button and a depth change button are together displayed.

The user may control a volume during a recording operation by using the volume button. When the user presses a storage button or a recoding hot key during a recording operation, the controller 180 displays a message of 'recording completed' or 'storage completed'. Then, the controller 180 stores the recorded image in a broadcast storage box.

Figure 13:
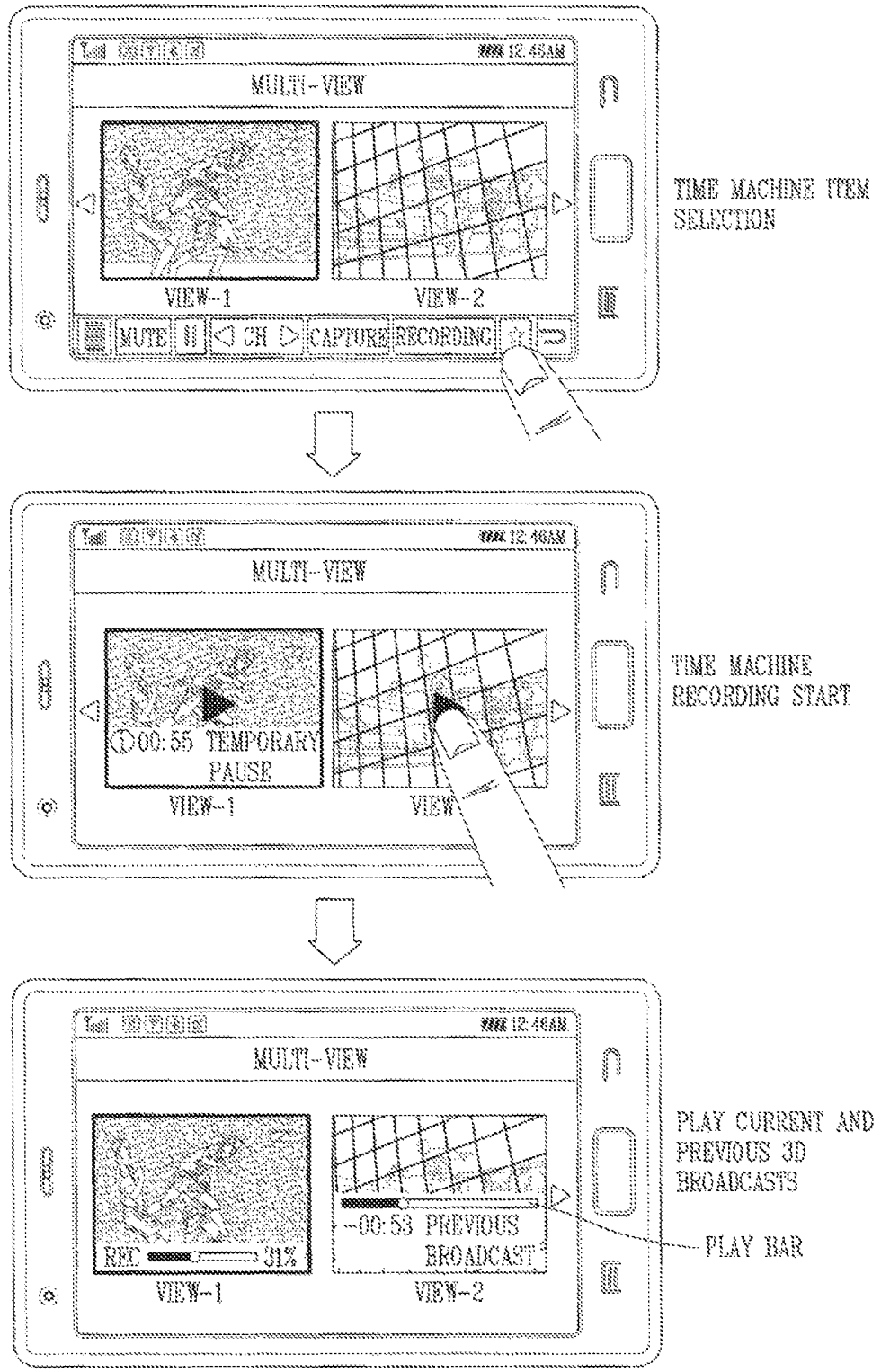
FIG. 13 is a view illustrating an example to execute a time machine function in a multi-angle display state according to the present invention.

FIG. 13 is a view illustrating an example to execute a time machine function in a multi-angle display state according to the present invention.

Once a user touches a time machine item on a control menu or presses a broadcast hot key for a long time, the controller 180 starts to execute a time machine recording with respect to the current angle, or a time machine recording of a 3D image with respect to each angle view. Once the time machine recording is started, playing the 3D image is temporarily stopped, and a playing button of " " is displayed at the center of the 3D image screen. And, messages such as a time machine icon ( ), a recording time (00:55) and a temporary pause are displayed at a lower end of the 3D image screen.

If a play button ( ) is pressed in the time machine state, the current 3D broadcast is played. And, if a play button ( ) of the previous broadcast is pressed, the previous 3D broadcast is played. The previous 3D broadcast may be played in the form of a PIP, and may be replaced by the current 3D broadcast when being touched. A play bar and play time are displayed on a lower end of the previous 3D broadcast screen. A user may selectively execute a fast forward (FF) or a rewind (RR) by performing a touch and drag operation with respect to the play bar when the previous 3D broadcast is played. Then, when the playing of the previous 3D broadcast is completed (recording time expired), the previous broadcast or PIP-displayed previous broadcast disappears.

If the user presses a 'current broadcast' button or a 'back button' indicating cancel when a predetermined recorded 3D broadcast is played by a time machine function, the time machine function is canceled and the current broadcast is played.

In the present invention, the capture and recorded (generally-recorded or time machine-recorded) 3D image according to each angle view may be transmitted via SMS, MMS and e-mail.

A type of an angle view is selected from multi-angle views provided on one screen, according to a location of a camera when a user enjoys a sports game or a concert. A plurality of angle views includes an angle view frequency viewed by the user. In case of providing a multi-angle view with respect to one 3D image, a differential charging may be executed with respect to each angle view.

In the present invention, when providing a preview with respect to a multi-angle view or when performing an angle view switching by a user, charging information is together provided. This may allow the user to select a suitable angle view. Upon selection of the specific angle view by the user based on the charging information, a charging bill is transmitted via SMS and MMS.

Figure 14:
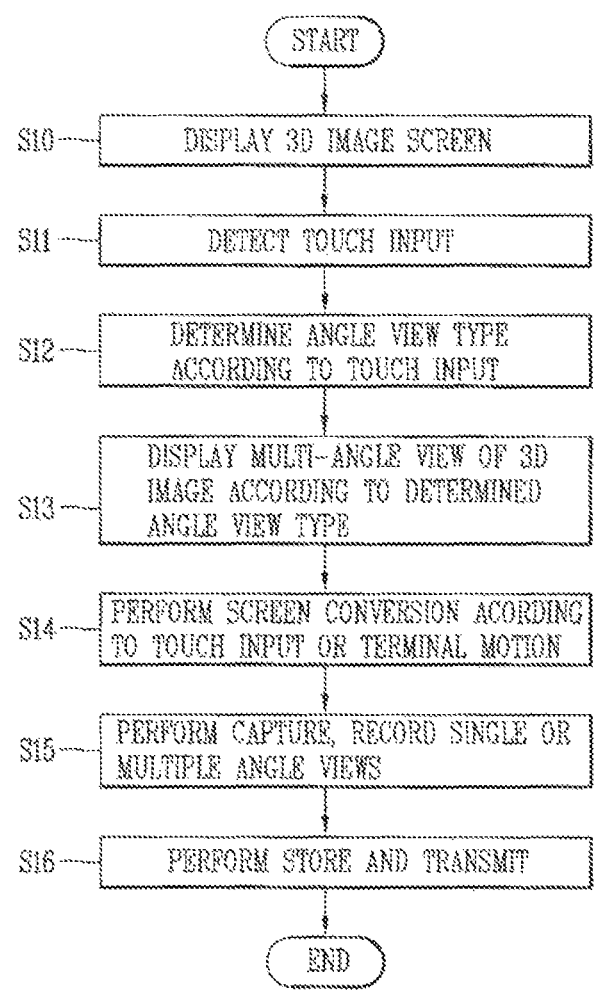
FIG. 14 is a flowchart illustrating a method for controlling a multi-angle view of a mobile terminal according to the present invention.

FIG. 14 is a flowchart illustrating a method for controlling a multi-angle view of a mobile terminal according to the present invention.

As shown in FIG. 14, a user selects a 3D image of a specific channel to be viewed. The selected 3D image is displayed on the display unit 151. When the displayed 3D image provides multi-angle views, the controller 180 displays an angle indication having a predetermined size and shape at a predetermined position of a 3D image screen (S10). The angle identification may be an icon, an icon and a text (the number of cameras and a theme), a still image, a moving image and a text. Hereinafter, the angle identification may be referred to as an angle icon.

Once the 3D image and the angle icon are displayed, the controller 180 detects a user's touch input (S11). The touch input includes touching a control menu, selecting a specific angle view from the control menu, and a direct touch gesture with respect to the screen or the angle icon (touch and drag to draw a small shape).

The controller 180 analyzes the user's touch input, and determines a type of an angle view corresponding to the analysis result (S12). Then, the controller 180 displays the 3D image on the screen as the determined angle view type (S13).

Next, the controller 180 performs a screen conversion (screen switching) between multi-angle views according to a user's touch input (touch, touch and drag and touch flicking), or a motion of the mobile terminal (motion in X, Y and Z axes directions) on a preview screen of the displayed multi-angle view (S14). Alternatively, the screen conversion may be executed by using numeric buttons or numeric keys.

The user may select a desired angle view of a 3D image in a touch manner while a screen conversion is performed between multi-angle views, and may view the selected 3D image. If necessary, the user may re-view the multi-angle view in the form of a preview by the multi-angle view display method.

While viewing a 3D image of a specific angle view, the user may execute various operations such as capture, recording (general recording and time machine recording), storage and transmission (S15). The various operations may be set through a control menu.

The user may perform, through the control menu, a single (individual) capture or a multi (consecutive) capture or a recording with respect to a specific angle view or at least one angle view. And, the user may store the captured or recorded 3D image, and may transmit a transmission menu to another user. The controller 180 detects a user's touch input for performing the operation, and executes a control for performing the operation (S16).

Figure 15:
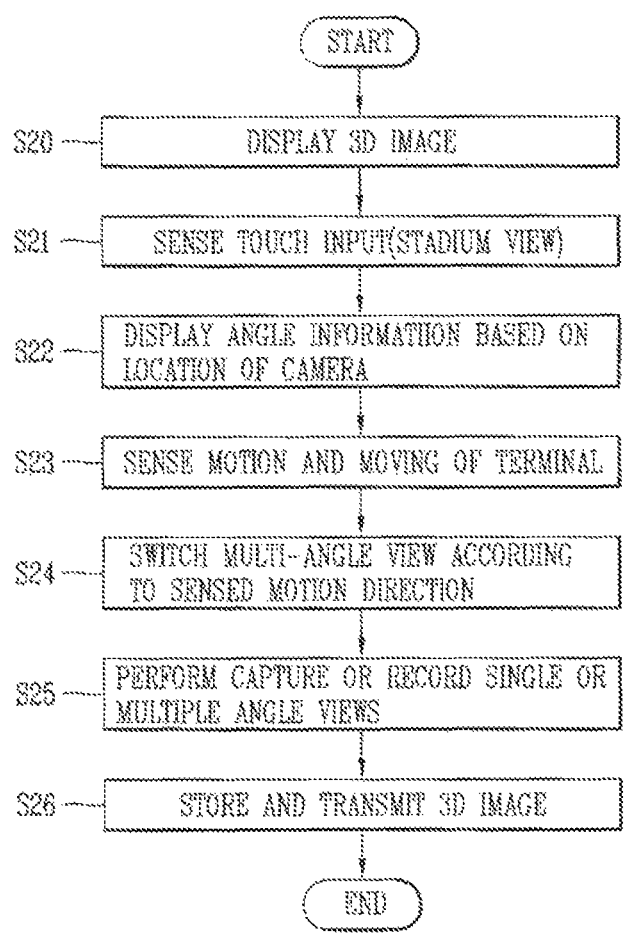
FIG. 15 is a flowchart illustrating a method for controlling a multi-angle view of a mobile terminal according to a stadium view of the present invention.

FIG. 15 is a flowchart illustrating a method for controlling a multi-angle view of a mobile terminal according to a stadium view of the present invention.

Firstly, the controller 180 displays, on the display unit 151, a 3D image of a channel selected by a user (S20). Under this state, the controller 180 determines that displaying a specific view, e.g., a stadium view has been requested based on a user's predetermined touch input (circular gesture) sensed at the center of the screen or on an angle icon (S21).

Upon requesting for a stadium view by a user, the controller 180 receives information on a location of a camera which captures the 3D image. Then, the controller 180 displays, on the screen, angle information such as a multi-angle view and each type of information (angle icon and switching icon) based on the location information of the camera (S22).

While viewing the displayed multi-angle view, the user performs conversion (switching) and selection with respect to each angle with using each type of information, thereby viewing a desired angle view of the 3D image. Here, the controller 180 detects a motion and a moving direction (X, Y and Z axes directions) of the mobile terminal, and performs a switching with respect to the displayed multi-angle view (S23, S24). If a specific angle view is selected from angle views to be subsequently switched, the controller 180 displays the selected angle view of the 3D image on the screen.

The user performs a capture or a recording (time machine recording) with respect to one or more angle views. The controller 180 may provide a control menu to a touch input for performing the operation, and performs a capture or a recording with respect to one or more angle views according to a selection or a hot key input on the control menu (S25).

Upon completion of the capture, a storage button may be displayed on the captured data. During the recording, buttons for changing a volume, a time point and a depth of the 3D image being recorded are provided. This may allow the user to change a recording setting with respect to the 3D image.

Upon completion of the capture or the recording, the controller 180 stores the 3D image in a broadcast storage box according to the user's command. Then, the controller 180 displays, on the screen, a message indicating storage completion (S26). And, the captured or recoded 3D image of a specific angle may be transmitted to another user via SMS or MMS.

In the present invention, a segregated view was taken as an example so as to explain the operations to capture, record (time machine-record), store and transmit a 3D image. However, the operations may be also implemented in a PIP view, a stadium view and other view.

In the present invention, the 3D image was implemented as a 3D broadcast image. However, the present invention is not limited to this. That is, the 3D image may include VOD, other image and a moving image.

As aforementioned, in the present invention, multi-angle views of a 3D image captured by a plurality of cameras are displayed as various angle view types according to a touch input. And, the 3D image undergoes a switching and a selection, and undergoes a capturing or recording with respect to each displayed angle view. This may provide an effective interface with respect to a multi-angle view, and may allow a user to more conveniently view the various-angle views of the 3D image.

The aforementioned method may be implemented as a program code stored in a computer-readable storage medium. The storage medium may include ROM, RAM, CD-ROM, a magnetic tape, a floppy disc, an optical data storage device, etc. And, the storage medium may be implemented as carrier wave (transmission via the Internet). The computer may include the controller of the mobile terminal.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of controlling a three-dimensional (3D) multi-angle view in a mobile terminal, the method comprising:
   displaying a first 3D stereoscopic image including a multi-angle on a display screen;
   receiving a touch input on the display screen;
   displaying multi-angle views of the 3D stereoscopic image on the display screen according to a multi angle display type corresponding to the received touch input;
   receiving a selection of at least one of the multi-angle views; and
   displaying a second 3D stereoscopic image of a specific angle view on the display screen according to the received selection,
   wherein the multi-angle display type includes a segregated view, a gallery view, a picture-in-picture (PIP) view or a stadium view, and
   wherein the received touch input is one of a plurality of touch input types, and the multi angle display type corresponds to the touch input type of the received touch input.

2. The method of claim 1, wherein:
   the first 3D stereoscopic image further includes a broadcast image; and
   the touch input comprises a touch and drag operation to draw a preset shape, the preset shape being a straight line, a quadrangular shape or a circular shape.

3. The method of claim 2, wherein the touch input comprises an input at a center of a 3D image on the display screen or an input on an angle icon on the display screen.

4. The method of claim 1, further comprising displaying information related to angle indication at one side of the first 3D stereoscopic image.

5. The method of claim 4, wherein the information related to angle indication comprises an icon, text, a combination of an icon and text, a still image or a moving image.

6. The method of claim 1, wherein each of the multi-angle views comprise angle information having an audience rating, a picture quality, a transmission state, movement information, a number of sensed persons and website information related to the corresponding angle.

7. The method of claim 1, further comprising displaying the multi-angle views on the display screen again upon conversion between a horizontal view and a vertical view of the displayed second 3D broadcast image.

8. The method of claim 1, further comprising:
   sorting channels having multi-angle views;
   receiving input of a specific key or a touch of a specific position on the display screen; and
   displaying a list of the sorted channels when the input or touch is received,
   wherein the displayed list includes an image type angle view.

9. The method of claim 1, further comprising:
   receiving an input related to the displayed multi-angle views;
   receiving a motion of the mobile terminal; and
   switching the displayed multi-angle views according to the received input and motion.

10. The method of claim 9, wherein:
    the input related to the displayed multi-angle views comprises a key input, a proximity touch input or a direct touch input; and
    the proximity touch input and the direct touch input comprise a single touch, a touch and drag or a flicking touch.

11. The method of claim 9, further comprising:
    implementing at least one multi-angle view of the multi-angle views as a segregated view;
    displaying at least one bidirectional switching icon at right and left sides of the multi-angle views;
    receiving an input comprising a touch of the at least one bidirectional switching icon, a touch and flick of the bidirectional switching icon, touching of one or more numeric keys, touching one or more numeric buttons or movement of the mobile terminal in the X, Y or Z direction; and
    switching the at least one multi-angle view in response to the received input.

12. The method of claim 9, further comprising:
    implementing at least one multi-angle view of the multi-angle views as a picture-in-picture (PIP) angle view; and
    switching the PIP angle view of at the least one multi-angle view at a predetermined time interval.

13. The method of claim 9, further comprising:
    implementing at least one multi-angle view of the multi-angle views as a stadium view;
    receiving a direct touch on the display screen or a rotation degree of the mobile terminal; and
    switching the at least one multi-angle view in response to the received direct touch or rotation degree.

14. The method of claim 9, further comprising:
    implementing at least one multi-angle view of the multi-angle views as a gallery view;
    displaying at least one angle switch icon on the display screen;
    receiving a touch in one direction of the displayed at least one angle switch icon; and
    switching the at least one multi-angle view in response to the received touch.

15. A mobile terminal, comprising:
    a touch screen configured to display a three-dimensional (3D) stereoscopic image including a multi-angle;
    a sensing unit configured to sense a touch input on the touch screen; and
    a controller configured to:
      control the touch screen to display a first 3D stereoscopic image including a multi-angle;
      receive a touch input on the screen of the touch screen;
      control the touch screen to display multi-angle views of the 3D stereoscopic image according to the determined display type;
      receive a selection of at least one of the multi-angle views on the touch screen; and
      control the touch screen to display a second 3D stereoscopic image of a specific angle view according to the received selection,
    wherein the multi-angle display type includes a segregated view, a gallery view, a picture-in-picture (PIP) view or a stadium view, and
    wherein the received touch input is one of a plurality of touch input types, and the multi angle display type corresponds to the touch input type of the received touch input.

16. The mobile terminal of claim 15, wherein:
    the first 3D stereoscopic image further includes a broadcast image; and
    the touch input comprises a touch and drag operation to draw a preset shape, the preset shape being a straight line, a quadrangular shape or a circular shape.

17. The mobile terminal of claim 16, wherein the touch input comprises an input at a center of a 3D image on the touch screen or an input on an angle icon on the touch screen.

18. The mobile terminal of claim 15, wherein the controller is further configured to control the touch screen to display information related to angle indication at one side of the first 3D stereoscopic image.

19. The mobile terminal of claim 18, wherein the information related to angle indication comprises an icon, text, a combination of an icon and text, a still image or a moving image.

20. The mobile terminal of claim 15, wherein each of the multi-angle views comprise angle information having an audience rating, a picture quality, a transmission state, movement information, a number of sensed persons and website information related to the corresponding angle.

21. The mobile terminal of claim 15, wherein the controller is further configured to control the touch screen to display the multi-angle views again upon conversion between a horizontal view and a vertical view of the displayed second 3D broadcast image.

22. The mobile terminal of claim 15, wherein the controller is further configured to:
sort channels having multi-angle views;
receive an input of a specific key or a touch of a specific position on the touch screen; and
control the touch screen to display a list of the sorted channels when the input or touch is received,
wherein the displayed list includes an image type angle view.

23. The mobile terminal of claim 15, wherein the controller is further configured to;
receive an input related to the displayed multi-angle views;
receive a motion of the mobile terminal; and
control the touch screen to switch the displayed multi-angle views according to the received input and motion.

24. The mobile terminal of claim 23, wherein:
the input related to the displayed multi-angle views comprises a key input, a proximity touch input or a direct touch input; and
the proximity touch input and the direct touch input comprise a single touch, a touch and drag or a flicking touch.

25. The mobile terminal of claim 23, wherein the controller is further configured to:
implement at least one multi-angle view of the multi-angle views as a segregated view;
control the touch screen to display at least one bidirectional switching icon at right and left sides of the multi-angle views;
receive an input comprising a touch of the at least one bidirectional switching icon, a touch and flick of the at least one bidirectional switching icon, touching of one or more numeric keys, touching one or more numeric buttons or movement of the mobile terminal in the X, Y or Z direction; and
control the touch screen to switch the at least one multi-angle view in response to the received input.

26. The mobile terminal of claim 23, wherein the controller is further configured to:
implement at least one multi-angle view of the multi-angle views as a picture-in-picture (PIP) angle view; and
control the touch screen to switch the PIP angle view of at the least one multi-angle view at a predetermined time interval.

27. The mobile terminal of claim 23, wherein the controller is further configured to:
implement at least one multi-angle view of the multi-angle views as a stadium view;
receive a direct touch on the screen of the touch screen or a rotation degree of the mobile terminal; and
control the touch screen to switch the at least one multi-angle view in response to the received direct touch or rotation degree.

28. The mobile terminal of claim 23, wherein the controller is further configured to:
implement at least one multi-angle view of the multi-angle views as a gallery view;
control the touch screen to display at least one angle switch icon;
receive a touch in one direction of the at least one angle switch icon; and
control the touch screen to switch the at least one multi-angle view in response to the received touch.

* * * * *